(12) United States Patent
Volkerink et al.

(10) Patent No.: US 11,527,148 B1
(45) Date of Patent: Dec. 13, 2022

(54) AUGMENTED REALITY FOR GUIDING USERS TO ASSETS IN IOT APPLICATIONS

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 0 days.

(21) Appl. No.: 17/449,934

(22) Filed: Oct. 4, 2021

Related U.S. Application Data

(60) Provisional application No. 63/087,225, filed on Oct. 4, 2020.

(51) Int. Cl.
*G08B 25/10* (2006.01)
*G08B 21/18* (2006.01)
*G16Y 10/40* (2020.01)
*G16Y 40/10* (2020.01)
*G16Y 20/10* (2020.01)

(52) U.S. Cl.
CPC ........... *G08B 25/10* (2013.01); *G08B 21/182* (2013.01); *G16Y 10/40* (2020.01); *G16Y 20/10* (2020.01); *G16Y 40/10* (2020.01)

(58) Field of Classification Search
CPC ...... G08B 25/00; G08B 21/182; G16Y 10/40; G16Y 20/10; G16Y 40/10
See application file for complete search history.

(56) References Cited

U.S. PATENT DOCUMENTS 5,478,991 A 12/1995 Watanabe
5,495,250 A 2/1996 Ghaem
(Continued)

FOREIGN PATENT DOCUMENTS

EP 1786143 A2 5/2007
JP 2008239282 A 10/2008
(Continued)

OTHER PUBLICATIONS

PCT Application No. PCT/US2018/064919, Written Opinion, dated Apr. 5, 2019, 7 pages.
(Continued)

*Primary Examiner* — Ojiako K Nwugo

(57) ABSTRACT

A wireless sensing system includes a first tape node and a second tape node. The first tape node has a low-power wireless-communications interface and an environmental sensor operable to capture and transmit a first set of environmental data of at least one environmental characteristic to the second tape node. The second node includes an environmental sensor, a low-power wireless-communication interface, a first processor, and a first memory communicatively coupled with the first processor, the first memory storing machine-readable instructions that, when executed by the first processor, cause the first processor to: capture a second set of environmental data; compute an environmental differential between the first set of environmental data and the second set of environmental data; compare the environmental differential to a predetermined environmental threshold; and transmit a notification to a client application of the wireless sensing system running on a client device of the wireless sensing system when the environmental differential exceeds the predetermined environmental threshold.

20 Claims, 15 Drawing Sheets

(56) References Cited

U.S. PATENT DOCUMENTS

| | | | |
|---|---|---|---|
| 5,499,717 A | 3/1996 | Hayashi | |
| 5,838,253 A | 11/1998 | Wurz | |
| 5,917,433 A | 6/1999 | Keillor | |
| 6,372,342 B1 | 4/2002 | Karaoglu | |
| 6,375,780 B1 | 4/2002 | Tuttle et al. | |
| 6,404,341 B1 | 6/2002 | Reid | |
| 6,614,392 B2 | 9/2003 | Howard | |
| 6,919,803 B2 | 7/2005 | Breed | |
| 7,009,517 B2 | 3/2006 | Wood | |
| 7,020,701 B1 | 3/2006 | Gelvin et al. | |
| 7,048,194 B2 | 5/2006 | Minami et al. | |
| 7,177,054 B2 | 2/2007 | Silverbrook et al. | |
| 7,259,030 B2 | 8/2007 | Daniels et al. | |
| 7,299,990 B2 | 11/2007 | Hoshina | |
| 7,321,167 B2 | 1/2008 | Zhong et al. | |
| 7,405,656 B2 | 7/2008 | Olsen | |
| 7,511,616 B2 | 3/2009 | Lake | |
| 7,540,603 B2 | 6/2009 | Otsuki | |
| 7,722,249 B2 * | 5/2010 | Kim | G01K 13/20 374/208 |
| 7,838,844 B2 | 11/2010 | Wagner | |
| 7,884,727 B2 | 2/2011 | Tran | |
| 8,062,735 B2 | 11/2011 | Bi | |
| 8,072,620 B2 | 12/2011 | Yamamoto et al. | |
| 8,110,254 B1 | 2/2012 | Sharma | |
| 8,171,791 B2 | 5/2012 | Sy et al. | |
| 8,269,633 B2 | 9/2012 | Hollander et al. | |
| 8,292,173 B2 | 10/2012 | Yturralde et al. | |
| 8,401,238 B2 | 3/2013 | Stahlin et al. | |
| 8,448,530 B2 | 5/2013 | Leuenberger et al. | |
| 8,658,455 B2 | 2/2014 | Shin et al. | |
| 8,716,629 B2 | 5/2014 | Klewer et al. | |
| 8,786,510 B2 | 7/2014 | Coleman | |
| 8,833,664 B2 | 9/2014 | Choi | |
| 8,879,276 B2 | 11/2014 | Wang | |
| 8,971,673 B2 | 3/2015 | Beinhocker | |
| 9,015,071 B2 | 4/2015 | Breed | |
| 9,070,286 B2 | 6/2015 | Moore | |
| 9,137,637 B2 | 9/2015 | Bilal et al. | |
| 9,159,635 B2 | 10/2015 | Elolampi et al. | |
| 9,182,231 B2 | 11/2015 | Skaaksrud | |
| 9,183,738 B1 | 11/2015 | Allen et al. | |
| 9,189,226 B2 | 11/2015 | Driesen et al. | |
| 9,372,123 B2 | 6/2016 | Li et al. | |
| 9,473,902 B2 | 10/2016 | Bilal et al. | |
| 9,496,582 B1 | 11/2016 | Lim et al. | |
| 9,543,495 B2 | 1/2017 | Paschkewitz et al. | |
| 9,543,549 B2 | 1/2017 | Bai et al. | |
| 9,583,428 B2 | 2/2017 | Rafferty et al. | |
| 9,632,050 B2 | 4/2017 | Zhong et al. | |
| 9,643,460 B2 | 5/2017 | Peine et al. | |
| 9,644,401 B2 | 5/2017 | Nguyen et al. | |
| 9,753,568 B2 | 9/2017 | McMillen | |
| 9,781,825 B2 | 10/2017 | Farkas et al. | |
| 9,824,329 B2 | 11/2017 | Stirling et al. | |
| 9,860,688 B2 | 1/2018 | Kulkarni et al. | |
| 10,275,943 B2 | 4/2019 | Choi | |
| 2003/0000128 A1 | 1/2003 | Wood et al. | |
| 2003/0018927 A1 | 1/2003 | Gadir et al. | |
| 2004/0044493 A1 | 3/2004 | Coulthard | |
| 2004/0131761 A1 | 7/2004 | Shakespeare | |
| 2006/0100299 A1 | 5/2006 | Malik et al. | |
| 2007/0049291 A1 | 3/2007 | Kim et al. | |
| 2007/0095905 A1 | 5/2007 | Kadaba | |
| 2007/0287473 A1 | 12/2007 | Dupray | |
| 2008/0079567 A1 * | 4/2008 | Poor | G08B 25/009 340/540 |
| 2008/0184795 A1 | 8/2008 | Woodard | |
| 2008/0198002 A1 | 8/2008 | Bartholf et al. | |
| 2008/0239282 A1 | 10/2008 | Zou et al. | |
| 2009/0051530 A1 | 2/2009 | Brooks et al. | |
| 2009/0072974 A1 | 3/2009 | Miyashita et al. | |
| 2009/0174600 A1 | 7/2009 | Mazlum et al. | |
| 2009/0192709 A1 | 7/2009 | Yonker et al. | |
| 2009/0196267 A1 | 8/2009 | Walker | |
| 2010/0082870 A1 | 4/2010 | Tokuhara | |
| 2010/0096181 A1 | 4/2010 | Nakamura | |
| 2010/0180701 A1 | 7/2010 | Daniel et al. | |
| 2010/0201519 A1 | 8/2010 | Dagher | |
| 2010/0230498 A1 | 9/2010 | Atherton | |
| 2010/0299401 A1 | 11/2010 | Lloyd | |
| 2011/0054979 A1 | 3/2011 | Cova et al. | |
| 2011/0192465 A1 * | 8/2011 | Collings, III | F16K 37/005 137/554 |
| 2011/0251469 A1 | 10/2011 | Varadan | |
| 2012/0271540 A1 | 10/2012 | Miksa et al. | |
| 2012/0278676 A1 | 11/2012 | Teraura | |
| 2013/0107770 A1 | 5/2013 | Marsden et al. | |
| 2013/0131980 A1 | 5/2013 | Ginsberg | |
| 2013/0250357 A1 | 9/2013 | Yu | |
| 2014/0014403 A1 | 1/2014 | Miller et al. | |
| 2014/0240088 A1 | 8/2014 | Robinette et al. | |
| 2014/0265915 A1 | 9/2014 | Huang et al. | |
| 2014/0268780 A1 | 9/2014 | Wang | |
| 2014/0274139 A1 | 9/2014 | Bilal et al. | |
| 2014/0317406 A1 | 10/2014 | Lewis et al. | |
| 2015/0034635 A1 | 2/2015 | Dagher | |
| 2015/0154531 A1 * | 6/2015 | Skaaksrud | H04W 4/80 705/14.66 |
| 2015/0324745 A1 | 11/2015 | Goodall | |
| 2015/0347959 A1 | 12/2015 | Skaaksrud | |
| 2015/0349667 A1 | 12/2015 | Andosca et al. | |
| 2015/0354973 A1 | 12/2015 | Wang et al. | |
| 2015/0382154 A1 | 12/2015 | Bilal et al. | |
| 2016/0011074 A1 | 1/2016 | Mian et al. | |
| 2016/0026213 A1 | 1/2016 | Li et al. | |
| 2016/0110085 A1 * | 4/2016 | Barton | H04L 12/283 715/736 |
| 2016/0147353 A1 | 5/2016 | Fliz et al. | |
| 2016/0188181 A1 * | 6/2016 | Smith | G06F 3/0412 715/765 |
| 2016/0205509 A1 | 7/2016 | Hopcraft et al. | |
| 2016/0233927 A1 | 8/2016 | Wu | |
| 2016/0239801 A1 | 8/2016 | Burch, V et al. | |
| 2016/0269533 A1 * | 9/2016 | Taylor | G08B 29/20 |
| 2016/0270215 A1 | 9/2016 | Goto | |
| 2016/0358444 A1 * | 12/2016 | Lundy | G08B 21/02 |
| 2016/0370210 A1 | 12/2016 | Kapusta et al. | |
| 2016/0377440 A1 | 12/2016 | Dorum | |
| 2017/0017872 A1 | 1/2017 | Kato et al. | |
| 2017/0025547 A1 | 1/2017 | Cho et al. | |
| 2017/0039666 A1 | 2/2017 | Kuersten et al. | |
| 2017/0079144 A1 | 3/2017 | Coleman et al. | |
| 2017/0161679 A1 | 6/2017 | Stingel et al. | |
| 2017/0337405 A1 | 11/2017 | Schutz | |
| 2018/0003507 A1 | 1/2018 | Arslan et al. | |
| 2018/0046964 A1 | 2/2018 | Leoni et al. | |
| 2018/0104609 A1 | 4/2018 | Musliner | |
| 2018/0165568 A1 | 6/2018 | Khoche | |
| 2018/0190096 A1 * | 7/2018 | Lundy | G08C 17/02 |
| 2019/0041836 A1 | 2/2019 | Cella et al. | |
| 2019/0250653 A1 * | 8/2019 | Conlon | G06Q 10/0833 |
| 2019/0265082 A1 | 8/2019 | Zafar et al. | |
| 2020/0072485 A1 * | 3/2020 | LaPalme | G08B 25/10 |
| 2020/0098238 A1 | 3/2020 | Skaaksrud | |
| 2020/0100115 A1 * | 3/2020 | Skaaksrud | A62C 3/07 |
| 2022/0100263 A1 * | 3/2022 | Nagar | A01G 25/16 |

FOREIGN PATENT DOCUMENTS

| | | |
|---|---|---|
| JP | 2009230500 A | 10/2009 |
| JP | 2011090670 A | 5/2011 |
| JP | 2012141995 A | 7/2012 |
| WO | 2014195756 A1 | 12/2014 |
| WO | 2016120628 A1 | 8/2016 |
| WO | 2017046699 A1 | 3/2017 |
| WO | 2017100707 A3 | 7/2017 |

OTHER PUBLICATIONS

Dementyev, SensorTape: Modular and Programmable 3D-Aware Dense Sensor Network on a Tape, In Proc. of UIST 2015.

(56) References Cited

OTHER PUBLICATIONS

Griffin et al., Adhesive RFID Sensor Patch for Monitoring of Sweat Electrolytes, in IEEE Transactionson Bio-Medical Engineering, Nov. 2014.

Pyo et al., Development of a Map Matching Method Using the Multiple Hypothesis Technique, 2001 IEEE.

Liu, Survey of Wireless Based Indoor Localization Technologies, arXiV:1709.01015v2 [cs.NI] Mar. 14, 2018.

Cheung et al., Least Squares Algorithms for Time-of-Arrival-Based Mobile Location, IEEE Transactions on Signal Processing, vol. 52, No. 4, Apr. 2004, pp. 1121-1128.

Frazier et al., Fully-Drawn Carbon-Based Chemical Sensors on Organic and Inorganic Surfaces, Lab Chip. Oct. 21, 2014; 14(20): 4059-4066. doi:10.1039/c4lc00864b.

Alsheikh et al., Machine Learning in Wireless Sensor Networks: Algorithms, Strategies, and Applications, arXiv:1405.4463v2 [cs NI] Mar. 19, 2015.

Farooqui et al., A Paper Based Ink Jet Printed Real Time Location Tracking TAB, 2013 IEEE MTT-S International Microwave Symposium Digest (MTT).

Gong et al., Low-Cost Sensor Tape for Environment Sensing Based on Roll-to-Roll Manufacturing Process, In Proc. of IEEE Sensors 2012.

Olyazadeh, Least Square Approach on Indoor Positioning Measurement Techniques, 2012.

Wimmer et al., Modular and Deformable Touch-Sensitive Surfaces Based on Time Domain Reflectometry, UIST 11 Proceedings of the 24th Annual ACM Symposium on User Interface Software and Technology, pp. 517-526, Santa Barbara,CA, USA, Oct. 16-19, 2011.

Olberding et al., A Cuttable Multi-Touch Sensor, Proceeding UIST, 13 Proceedings of the 26th Annual ACM Symposium on User Interface Software and Technology, pp. 245-254, St. Andrews, Scotland, United Kingdom, Oct. 8-11, 2013.

Zhang et al., Deep Neural Networks for Wireless Localization in Indoor and Outdoor Environments, Neurocomputing 194 (2016), pp. 279-287.

Roundy et al., Energy Harvester for Rotating Environments Using Offset Pendulum and Nonlinear Dynamics, Smart Materials and Structures, IOP Publishing Ltd, Sep. 9, 2014.

Ku et al., Joint Power Waveforming and Beamforming for Wireless Power Transfer, IEEE Transactions on Signal Processing, vol. 65,No. 24,Dec. 15, 2017, p. 6409.

PCT Application No. PCT/US2019/042488, International Search Report and Written Opinion, dated Nov. 5, 2019.

Shen et al., A Mobility Framework to Improve Heterogeneous Wireless Network Services, Inderscience Enterprises Ltd., 2011.

Iacono, Wireless Sensor Network Protocols, Universidad De Mendoza, Argentina, 2011.

Matin et al., Overview of Wireless Sensor Network, Intech, 2012 (http://doi.org/10.5772/49376.1).

Cimino et al., Wireless Communication, Identification, and Sensing Technologies Enabling Integrated Logistics: A Study in the Harbor Environment, Research Gate, Oct. 2015 (https://www.researchgate.net/publication/283117890_Wireless_Communication_Identification_and_Sensing_Technologies_Enabling_Integrated_Logistics_A_Study_in_the_Harbor_Environment).

PCT Application No. PCT/US2019/046588, International Search Report and Written Opinion, dated Jan. 6, 2020.

PCT Application No. PCT/2021/053437, International Search Report and Written Opinion dated Jan. 11, 2022, 11 pages.

\* cited by examiner

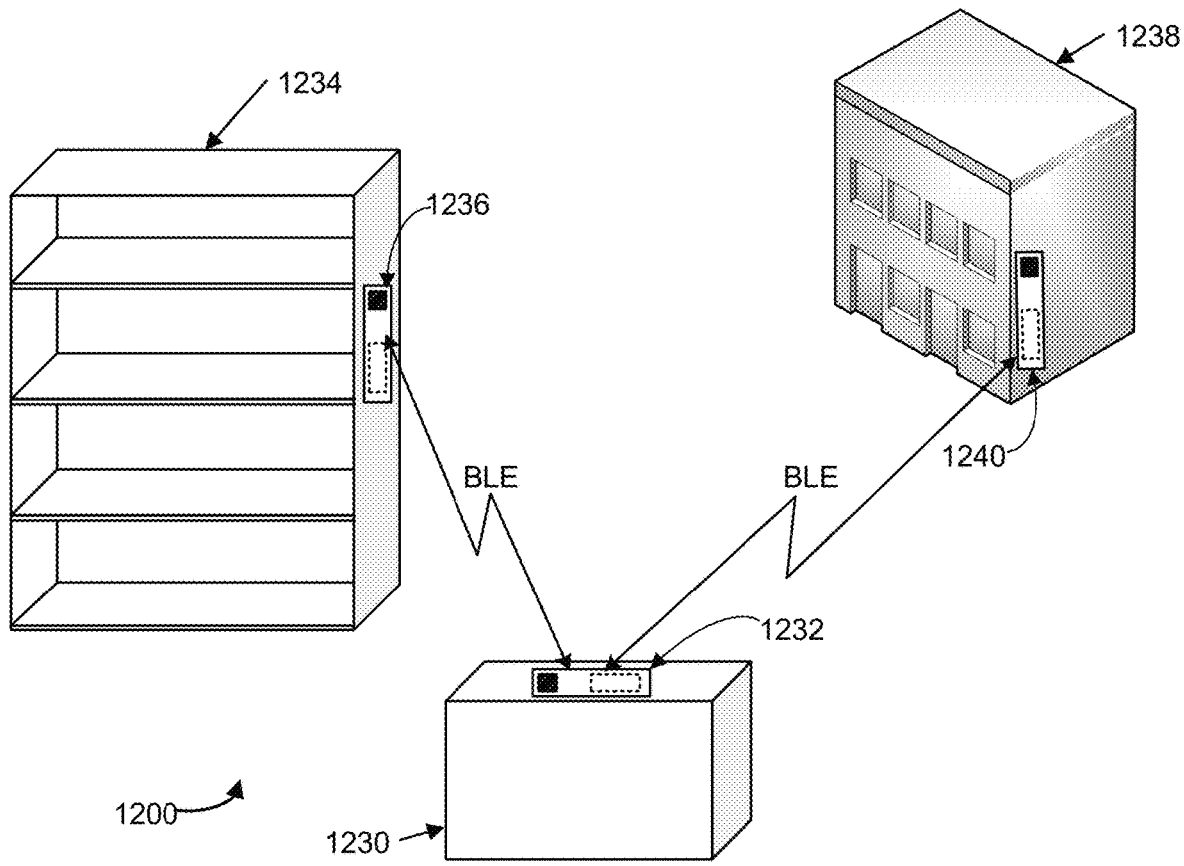

FIG. 12

| WIRELESS AGENT ATTRIBUTES TABLE | | |
|---|---|---|
| MASTER AGENT | SECONDARY AGENT | TERTIARY AGENT |
| Child Node | Intermediate Parent Node | Parent Node |
| Low Power Communications Interface (White) | Low and Medium Power Communications Interfaces (Green) | Low, Medium, High Power Communications Interfaces (Black) |
| Bluetooth LE | Bluetooth LE<br>Lora | Bluetooth LE<br>LoRa<br>Cellular<br>NFC<br>RFID |

FIG. 13

AUGMENTED REALITY FOR GUIDING USERS TO ASSETS IN IOT APPLICATIONS

RELATED APPLICATIONS

This application claims priority to U.S. Patent Application Ser. No. 63/087,225, titled "AUGMENTED REALITY FOR GUIDING USERS TO ASSETS IN IOT APPLICATION", filed Oct. 4, 2020, and is incorporated herein by reference.

BACKGROUND

In scenarios where a large amount of machinery or other assets are stored for periods of time, it may be difficult to quickly identify and react to emergent events. In particular, storage facilities having a large number of assets such as machinery, electronic components, and the like may be at increased risks for fires or other hazardous events that go unnoticed until significant damage to the assets has occurred.

SUMMARY

In one embodiment, a wireless sensing system includes a first tape node and a second tape node. The first tape node has a low-power wireless-communications interface and an environmental sensor operable to capture and transmit a first set of environmental data of at least one environmental characteristic to the second tape node. The second node includes an environmental sensor, a low-power wireless-communication interface, a first processor, and a first memory communicatively coupled with the first processor, the first memory storing machine-readable instructions that, when executed by the first processor, cause the first processor to: capture a second set of environmental data; compute an environmental differential between the first set of environmental data and the second set of environmental data; compare the environmental differential to a predetermined environmental threshold; and transmit a notification to a client application of the wireless sensing system running on a client device of the wireless sensing system when the environmental differential exceeds the predetermined environmental threshold.

In another embodiment, a method guides a user to an event detected by a first tape node of a wireless sensing system. The method includes: receiving, by the first tape node, a first set of environmental data of at least one environmental characteristic, from a second tape node, the first environmental data corresponding to an environmental characteristic proximate to the second tape node; capturing, by the first tape node, a second set of environmental data of the at least one environmental characteristic proximate the first tape node; computing, by the first tape node, an environmental differential between the first set of environmental data and the second set of environmental data; comparing the environmental differential with an environmental thresholds; and transmitting a notification of the event at the location of the first tape node to a client application running on an electronic device when at least one threshold is exceeded.

In another embodiment, a method guides a user to an event detected by a first tape node of a wireless sensing system. The method includes: receiving, by a client application of the wireless sensing system running on a client device, a notification, from a first tape node, that an event has occurred, indicating that an environmental threshold has been exceeded, the environmental threshold indicating that an environmental characteristic has affected an asset that a second tape node is attached thereto; generating, by the client application, a digital representation of a map, within a graphical user interface (GUI) of the client device, that guides a user to a location of the event; generating, by the client application, a display within the GUI of the client device, a graphical icon to represent a location of the event; responsive to the client device being within a proximity of either the first tape node or the second tape node, activating, by the client application, a camera of the client device to capture live video-footage; and generating, within the GUI, an AR overlay on the live video-footage to indicates the location of the event.

BRIEF DESCRIPTION OF THE FIGURES

FIG. 12 shows one example network formed by a master agent attached to an asset, a secondary agent attached to a cabinet, and a tertiary agent attached to infrastructure, according to an embodiment.

FIG. 13 is a table of example attributes of three different types of agents: a master agent, a secondary agent, and a tertiary agent, according to an embodiment.

DETAILED DESCRIPTION OF THE EMBODIMENTS

Figure 1:
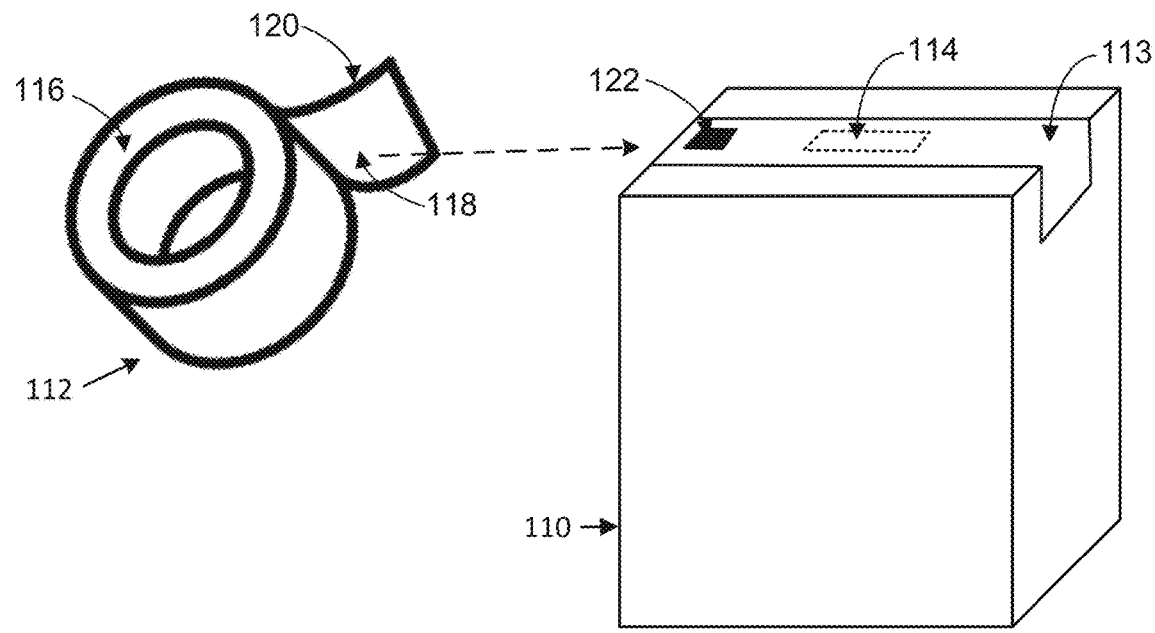
FIG. 1 is a diagrammatic view of a segment dispensed from a roll of an example adhesive tape platform used to detect tampering of an asset, according to an embodiment.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Examples of such applications include event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
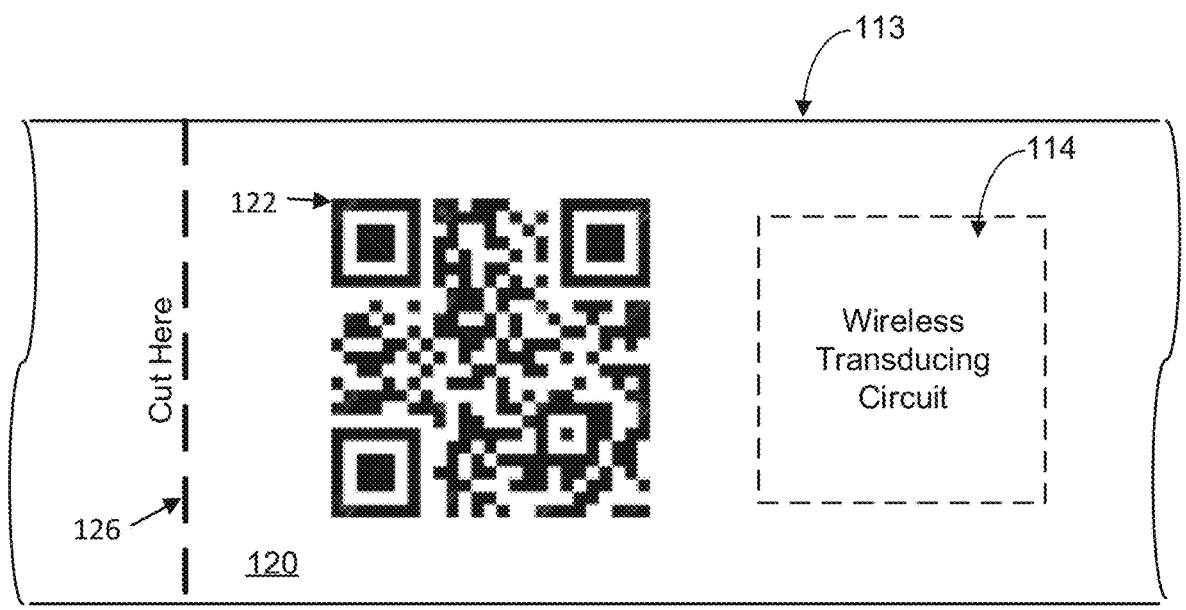
FIG. 2 is a diagrammatic top view of a portion of the segment of the example adhesive tape platform shown in FIG. 1.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example in FIG. 2, the segment 113 of the adhesive tape agent platform 112 includes an identifier 122 (e.g., a two-dimensional bar code, such as a QR Code), written instructions 124 (e.g., "Cut Here"), and an associated cut line 126 that indicates where the user should cut the adhesive tape agent platform 112. The written instructions 124 and the cut line 126 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 126 may demarcate the boundaries between adjacent segments at locations that are free of any active components of the wireless transducing circuit 114. The spacing between the wireless transducing circuit 114 and the cut lines 126 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 126. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 126).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
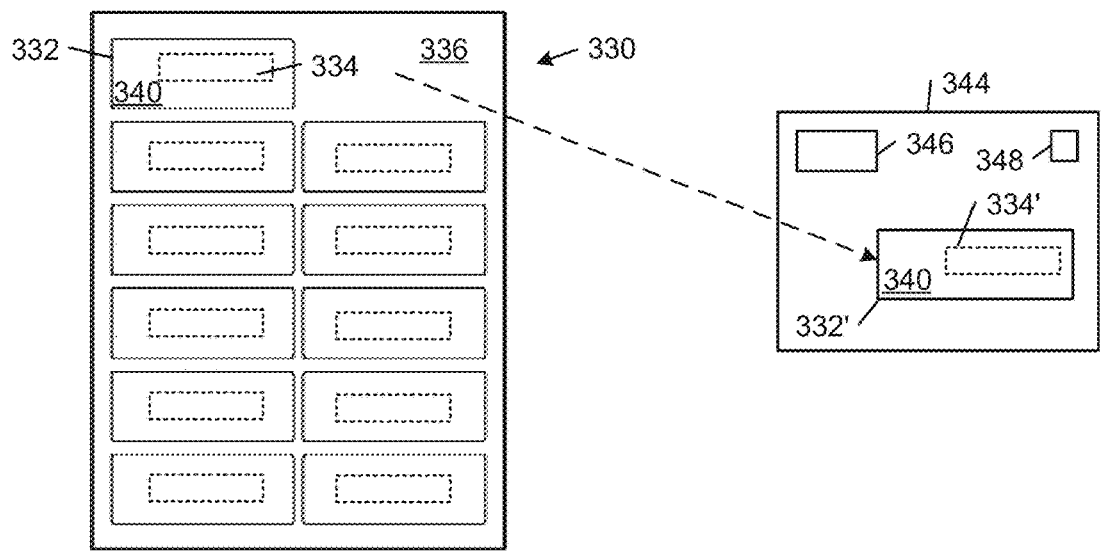
FIG. 3 is a diagrammatic view of an example of an envelope carrying a segment of an example adhesive tape platform dispensed from a backing sheet, according to an embodiment.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 344 also includes a return address 346 and, optionally, a postage stamp or mark 348.

In some examples, segments of the adhesive tape platform 112 are deployed by a human operator. The human operator may be equipped with a mobile phone or other device that allows the operator to authenticate and initialize the adhesive tape platform 112. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 112 for storage in a memory component of the adhesive tape platform 112.

In some examples, the wireless transducing circuit components 34 that are embedded in a segment 332 of the adhesive tape platform 112 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
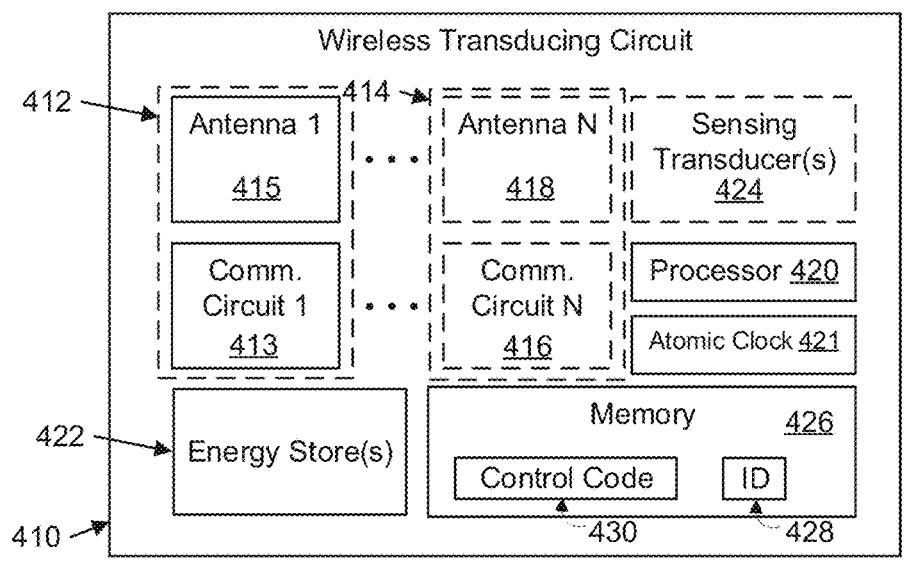
FIG. 4 is a schematic view of an example segment of an adhesive tape platform, according to an embodiment.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Figure 6A:
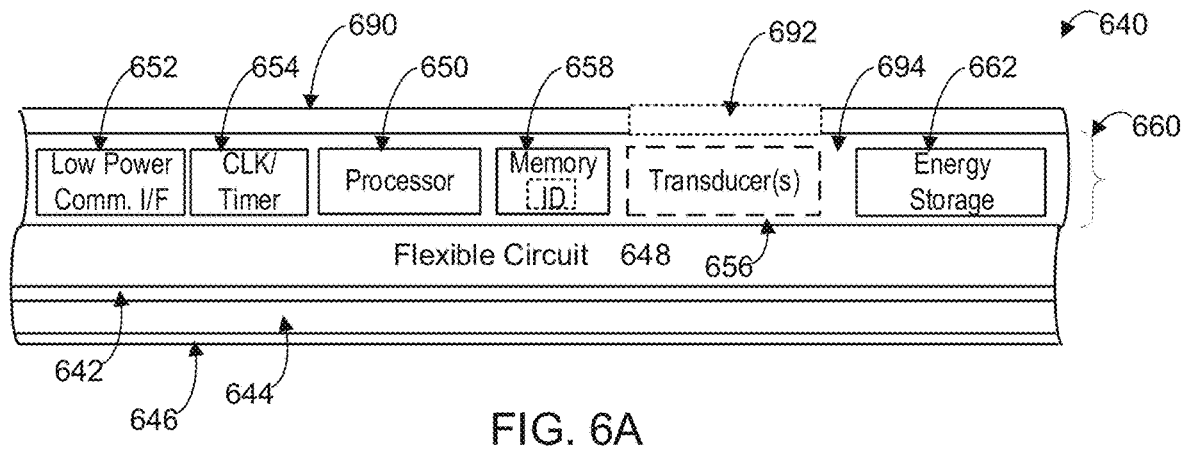
FIGS. 6A-C show diagrammatic cross-sectional side views of portions of different respective adhesive tape platforms, according to an embodiment.
Figure 6B:
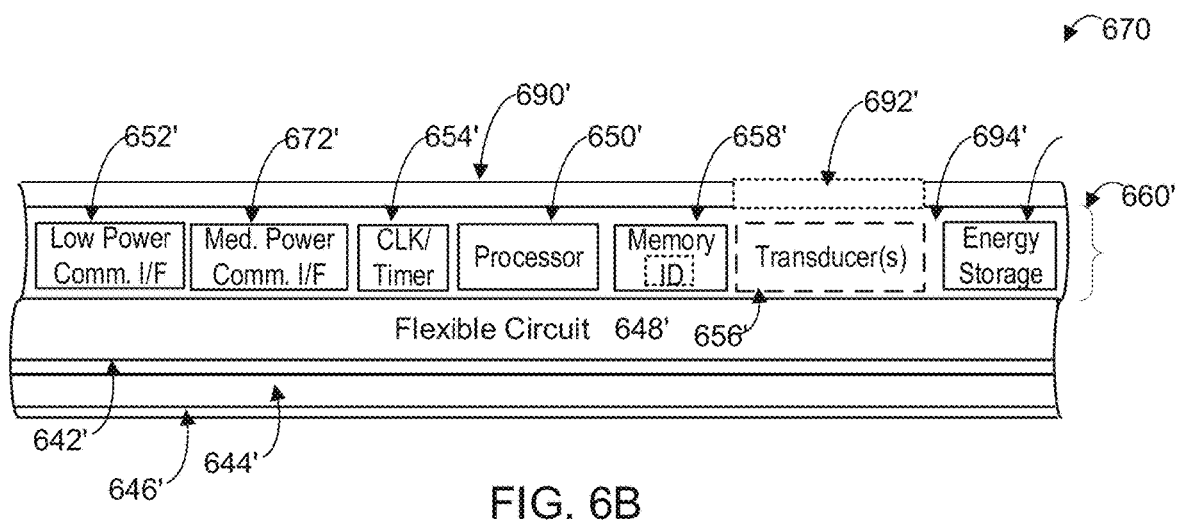
Figure 6C:
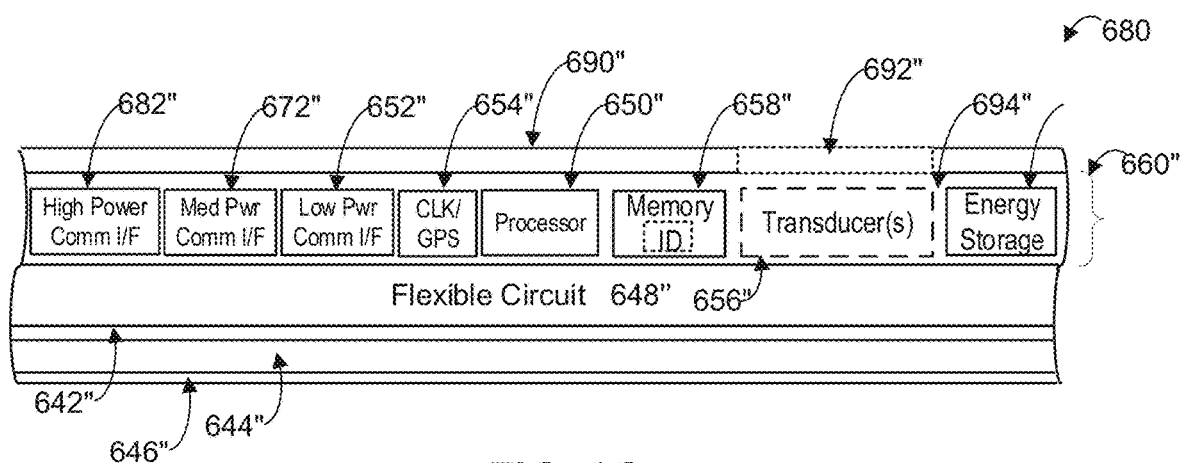

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 6A-C. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
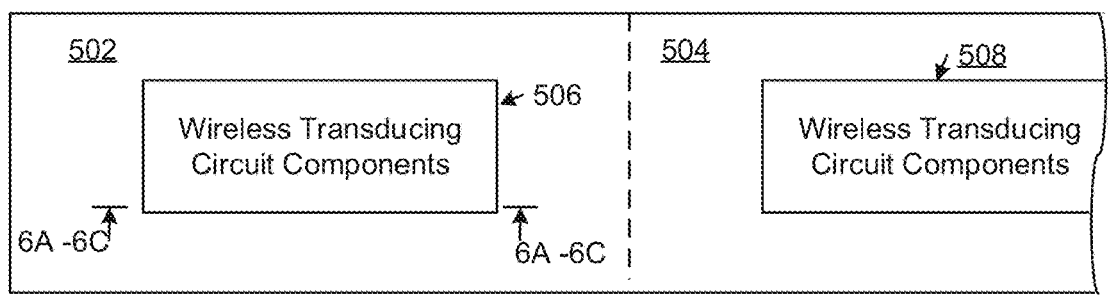
FIG. 5 is a diagrammatic top view of a length of an example adhesive tape platform, according to an embodiment.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 7A:
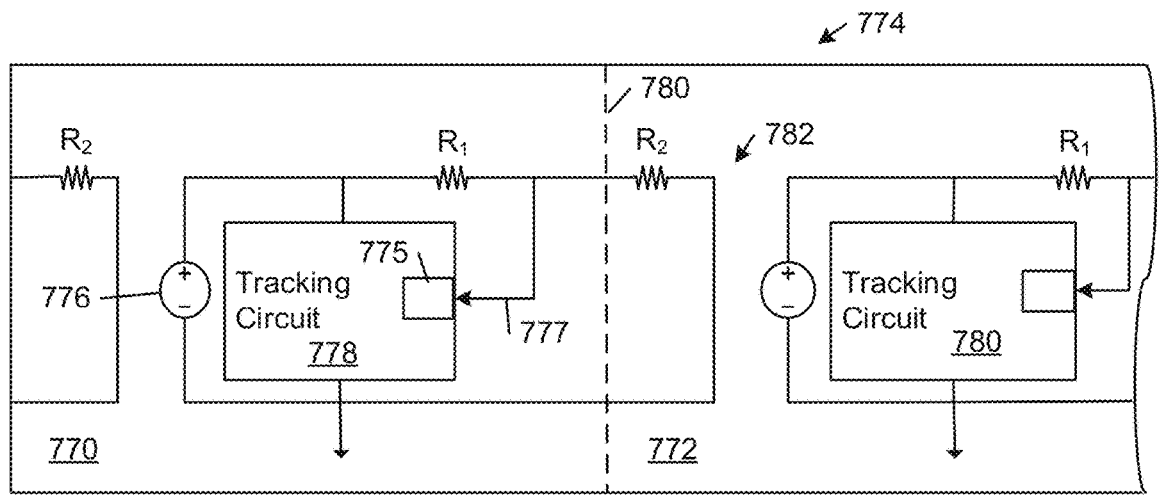
FIGS. 7A-C are diagrammatic top views of a length of an example tracking adhesive tape product, according to an embodiment.
Figure 7B:
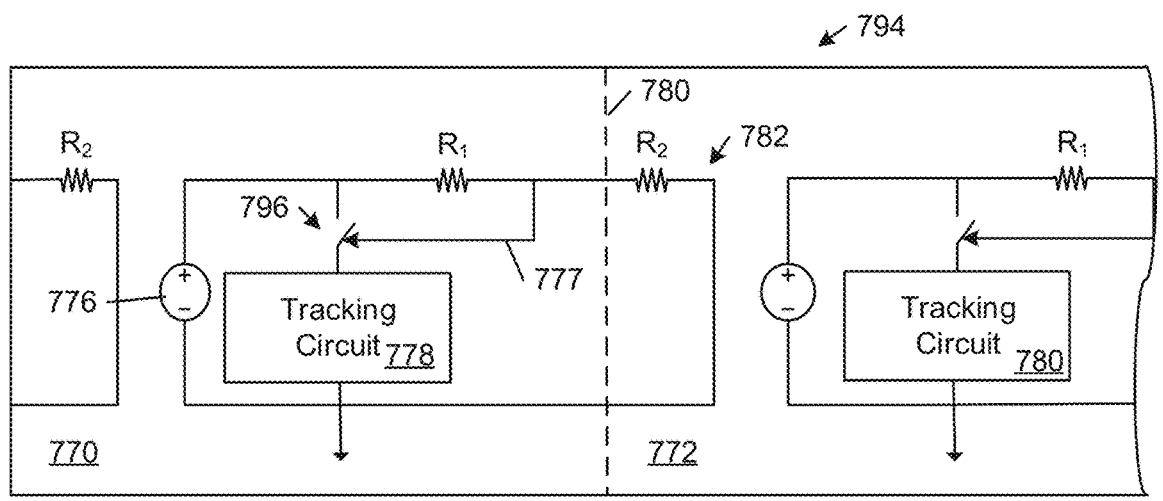
Figure 7C:
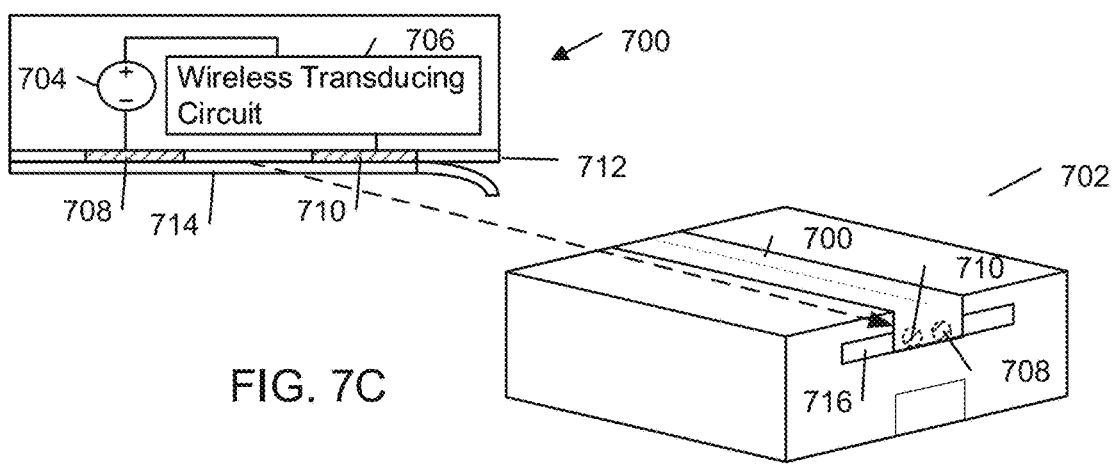

An example method of fabricating the adhesive tape platform 500 according to a roll-to-roll fabrication process is described in connection with FIGS. 5A-5C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A shows a cross-sectional side view of a portion of an example segment 640 of a flexible adhesive tape agent platform (e.g., platform 502 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 502 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648". The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Depending on the target application, the wireless transducing circuits 410 are distributed across the flexible adhesive tape platform 500 according to a specified sampling density, which is the number of wireless transducing circuits 410 for a given unit size (e.g., length or area) of the flexible adhesive tape platform 500. In some examples, a set of multiple flexible adhesive tape platforms 500 are provided that include different respective sampling densities in order to seal different asset sizes with a desired number of wireless transducing circuits 410. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 410. In some example applications (e.g., shipping low value goods), only one wireless transducing circuit 410 is used per asset, whereas in other applications (e.g., shipping high value goods) multiple wireless transducing circuits 410 are used per asset. Thus, a flexible adhesive tape platform 500 with a lower sampling density of wireless transducing circuits 410 can be used for the former application, and a flexible adhesive tape platform 100 with a higher sampling density of wireless transducing circuits 410 can be used for the latter application. In some examples, the flexible adhesive tape platforms 500 are color-coded or otherwise marked to indicate the respective sampling densities with which the wireless transducing circuits 410 are distributed across the different types of adhesive tape platforms 500.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

FIG. 7C shows a diagrammatic cross-sectional front view of an example adhesive tape platform 700 and a perspective view of an example asset 702. Instead of activating the adhesive tape platform 700 in response to separating a segment of the adhesive tape platform 700 from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

An example network communications environment 800 (herein used interchangeably with "network 800") includes a plurality of wireless nodes configured to detect tampering in assets (or other forms of events, such as temperature differentials, humidity differentials, acceleration differentials, etc.). Tampering may include, but is not limited to, opening assets such as boxes, containers, storage, or doors (e.g., of an asset container 764), moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the network 800. The network 800 is configured to provide a notification or alert to a user (e.g., authenticated user) of the network 800. In some embodiments, a wireless node may directly transmit the notification or alert to the user (e.g., to a client device, such as the mobile gateway 810 of a user). In other embodiments, a wireless node may include a display that indicates whether or not a tampering event has occurred (e.g., the display may be an indicator light or LED).

Alerts may be transmitted to the server/cloud, other wireless nodes, a client device, or some combination thereof, as discussed below. For example, in an embodiment, a wireless node of the network 800 captures sensor data, detects a tampering event, and transmits an alarm to a user of the wireless sensing system (e.g., without communicating with a server or cloud of the wireless sensing system). In another embodiment, a wireless node of the network 800 captures sensor data and transmits the sensor data to a gateway, parent node (e.g., black tape), or client device. The gateway, parent node, or client device detects a tampering event based on the received sensor data and transmits an alarm to a user of the network 800. In another embodiment, the wireless node of the network 800 captures sensor data, detects a tampering event, and transmits information describing the tampering event to a server or cloud of the network 800, in the form of a list with tampering events at specific times, along with which tape node or containers were tampered with, as shown in table 1502, discussed in FIG. 15. The server or cloud of the wireless sensing system transmits an alarm to a user of the wireless sensing system.

Figure 8:
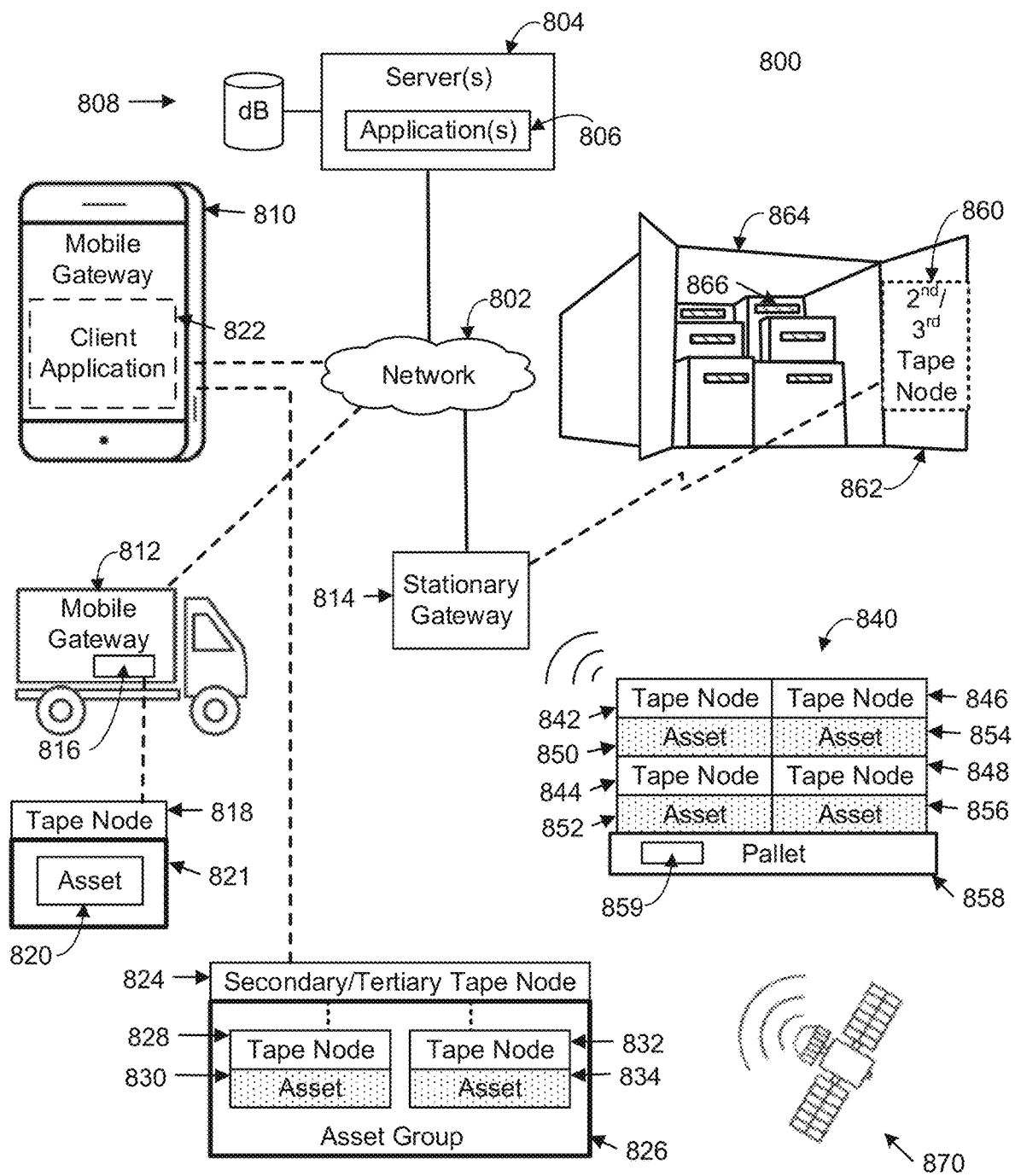
FIG. 8 is a diagrammatic view of an example of a network environment supporting communications with segments of an adhesive tape platform, according to an embodiment.

FIG. 8 shows an example network communications environment 800 (herein used interchangeably with "network 800") that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-6; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., the master agent 842-848, 859, secondary agent 824, 860, or tertiary agent 824, 860 shown in FIG. 8), where each tape node class has a different respective set of functionalities and/or capacities, as described above with respect to the "agents" in FIGS. 1-6. For example, the master agents 842-848, 859 (with reference to FIG. 6A have a lower-power wireless communication interface (e.g., the low-power wireless-communication interface 652, with reference to FIG. 6A), in comparison to the secondary and tertiary agents 824, 860 (with reference to FIG. 6B,C).

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In some embodiments, the client application 822 is accessible to authorized users and the authorize users may have varying levels of access to data stored in the network 800. For example, an employee (e.g., border patrol agent) at a checkpoint may have more access than a non-employee user, who may be granted a temporary access for a limited purpose of tracking a particular asset during the voyage, with a final destination to the non-employee user. This limited access for the non-employee user may be to ensure a safe chain-of-custody from end-to-end, without tampering, and it may be applicable to any type of asset.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to automatically search for tape nodes (as shown in FIGS. 14-17) and receive pings (e.g., alerts to nearby assets that an environmental threshold has been exceeded) from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-748 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of an asset container 864, and is further configured to communicate with the network service 808 over the network 802. In the illustrated example, the asset container 864 contains a number of parcels labeled or sealed by respective master tape nodes 866 and containing respective assets. The secondary or tertiary tape node 860 communicates with each of the master tape nodes 866 within the asset container 864 and communicates with the stationary gateway 814. In some examples, each of the master tape nodes 866 includes a low-power wireless communications-interface (e.g., the low-power wireless-communication interface 652, with reference to FIG. 6A), and the secondary or tertiary tape node 860 includes a low-power wireless-communications interface (low-power wireless-communication interfaces 652', 652", with reference to FIGS. 6B-6C) for communicating with the master tape nodes 866 contained within the asset container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the asset container 864 are closed, the secondary or tertiary tape node 860 is operable to communicate wirelessly with the master tape nodes 866 contained within the asset container 864. In some embodiments, both a secondary and a tertiary node are attached to the asset container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the asset container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segment 670 typically adheres to objects (e.g., a parcel 826 and an asset container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
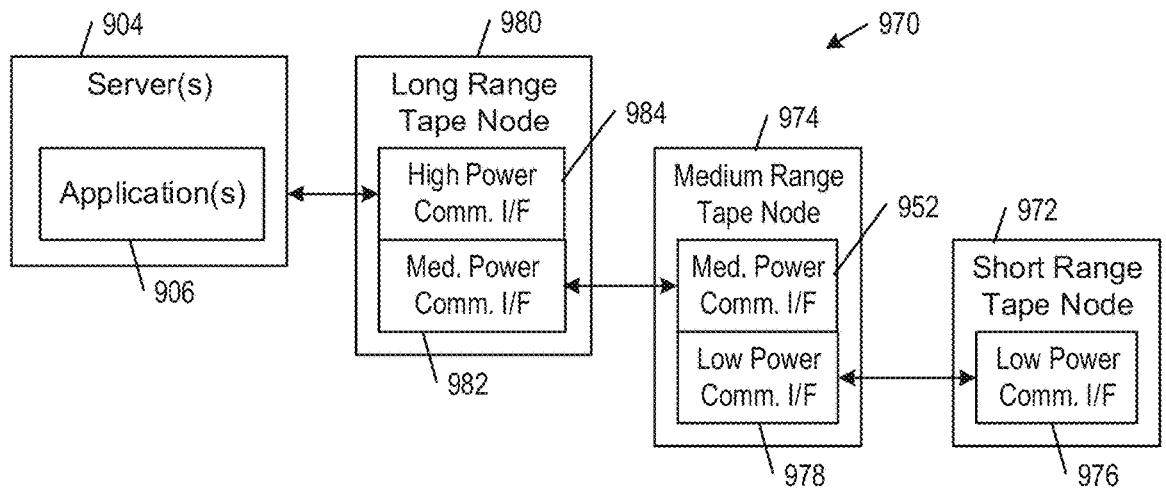
FIG. 9 is a diagrammatic view of a hierarchical communications network including an adhesive tape platform, according to an embodiment.

FIG. 9 shows an example hierarchical wireless communications network of tape nodes 970. In this example, the short-range tape node 972 and the medium range tape node 974 communicate with one another over their respective low power wireless communication interfaces 976, 978. The medium range tape node 974 and the long-range tape node 980 communicate with one another over their respective medium power wireless communication interfaces 978, 982. The long-range tape node 980 and the one or more network service servers 904 communicate with one another over the high-power communication interface 984. In some examples, the low power communication interfaces 976, 978 establish wireless communications with one another in accordance with the Bluetooth LE protocol, the medium power communication interfaces 986, 982 establish wireless communications with one another in accordance with the LoRa communications protocol, and the high-power communication interface 984 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 of the network service 908 designates a tape node at a higher level in a hierarchical communications network as a master node of a designated set of tape nodes at a lower level in the hierarchical communications network. For example, the designated master tape node may be adhered to a parcel (e.g., a box, pallet, or asset container) that contains one or more tape nodes that are adhered to one or more packages containing respective assets. In order to conserve power, the tape nodes typically communicate according to a schedule promulgated by the one or more network service servers 904 of the network service 908. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the network 800). In other examples, the master tape node processes the information contained in the received data packets and transmits the processed information to the one or more network service servers 904.

Figure 10:
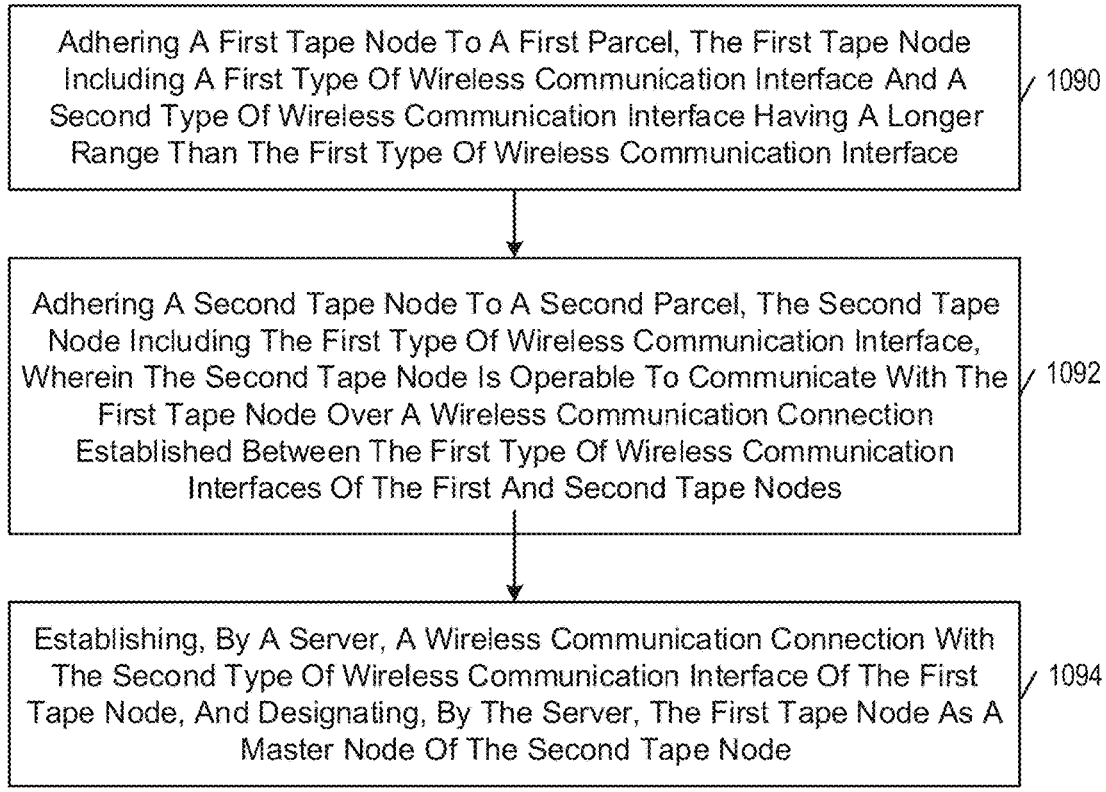
FIG. 10 is a flow diagram of a method of creating the hierarchical communications network, according to an embodiment.

FIG. 10 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 1090). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 1092). An application executing on a computer system (e.g., the one or more network service servers 904 of a network service 906) establishes a wireless communication connection with the second type of wireless communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces).

A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
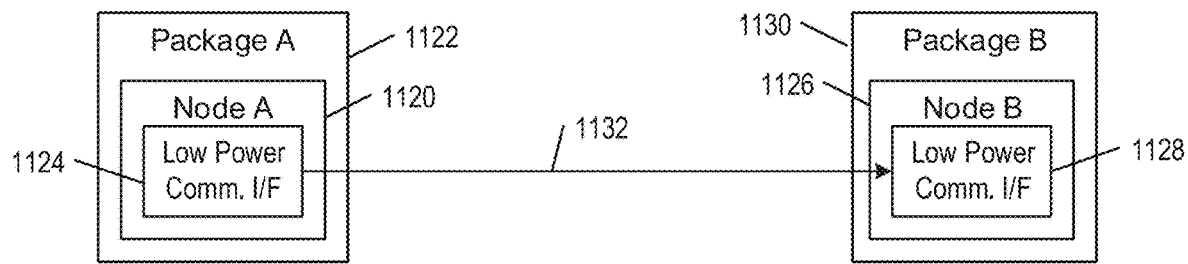
FIGS. 11A-E are diagrammatic views showing example use cases for a distributed agent operating system, according to an embodiment.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
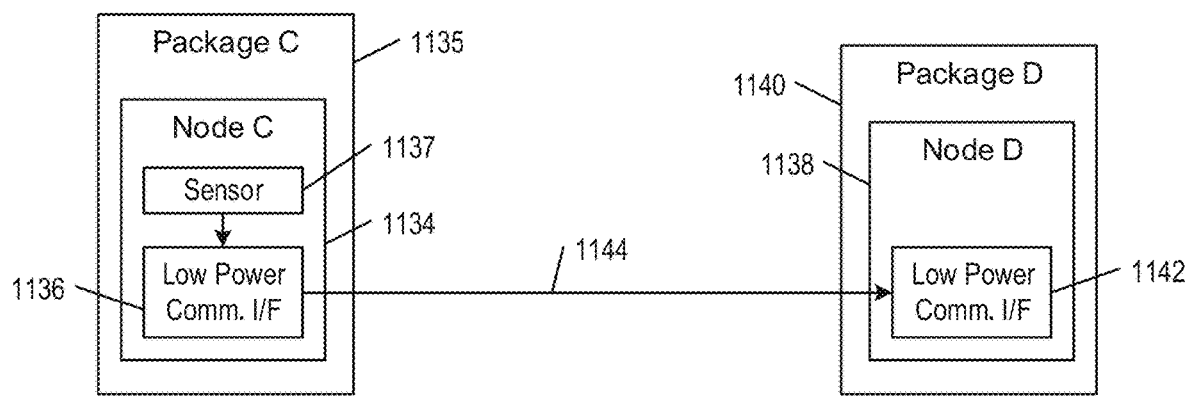

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D.

In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
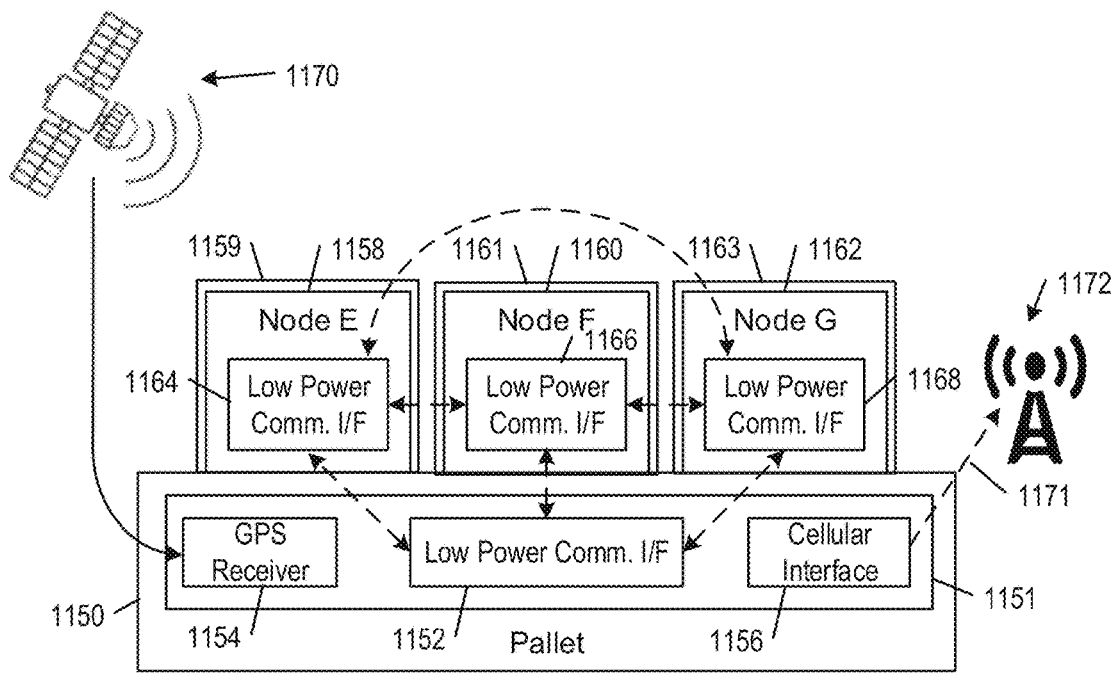

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In other embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental characteristics (e.g., temperature, humidity, pressure, chemical, etc.) in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., either by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 11D:
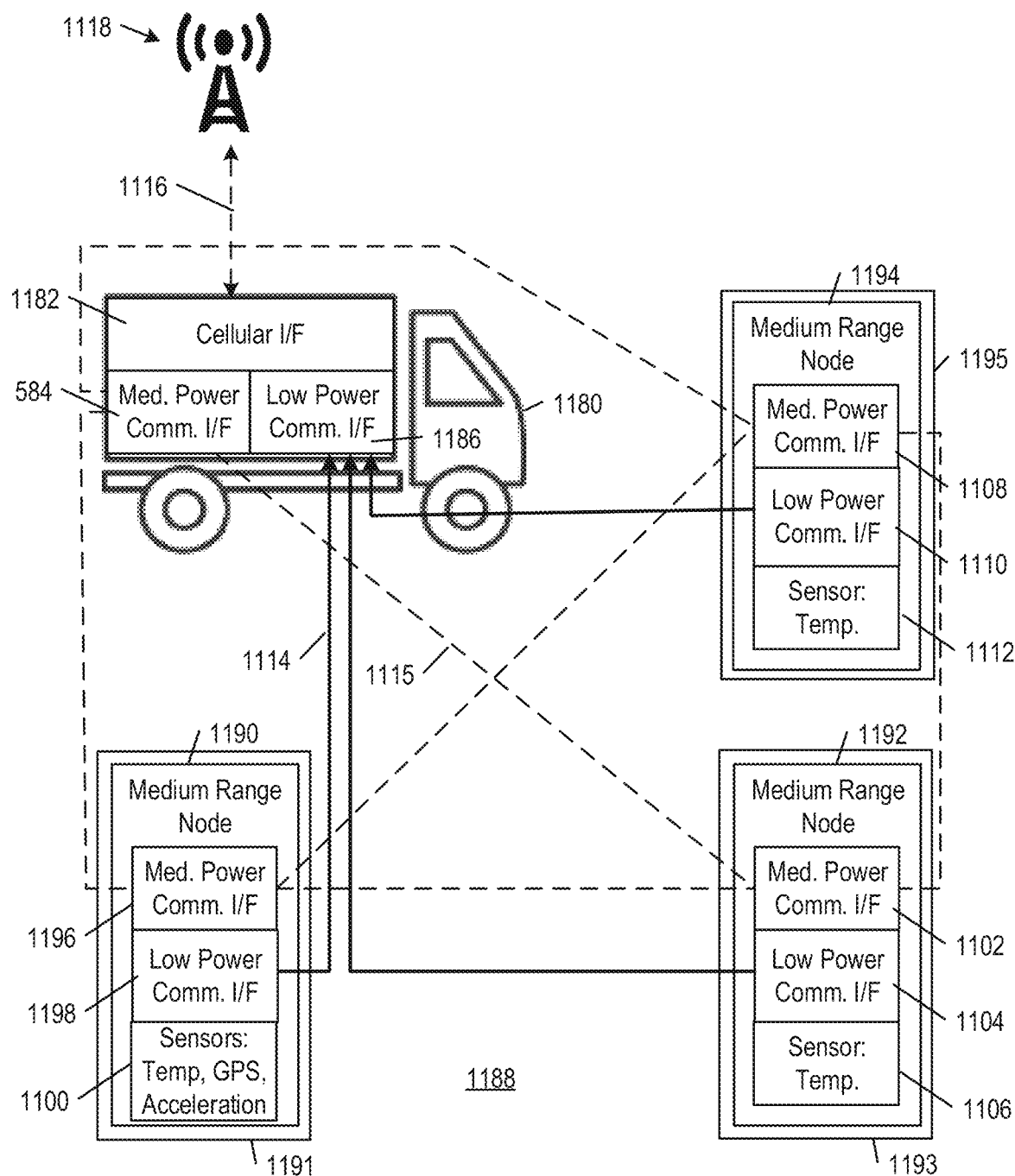

Referring to FIG. 11D, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1094 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1117), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 11E:
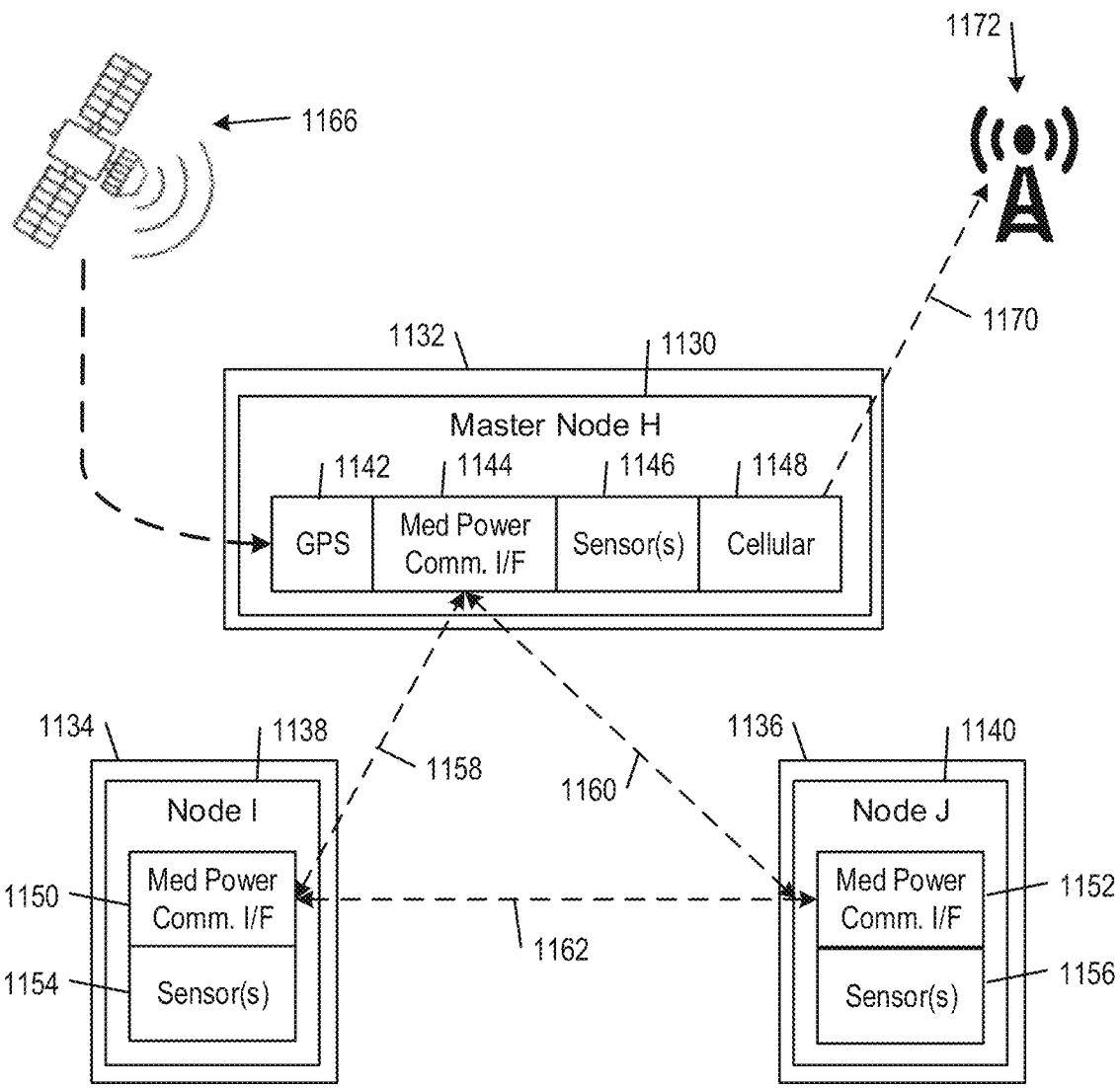

Referring to FIG. 11E, a master node 1130 is associated with a logistic item 1132 (e.g., a package) and grouped together with other logistic items 1134, 1136 (e.g., packages) that are associated with respective peripheral nodes 1138, 1140. The master node 1130 includes a GPS receiver 1142, a medium power communications interface 1144, one or more sensors 1146, and a cellular communications interface 1148. Each of the peripheral nodes 1138, 1140 includes a respective medium power communications interface 1150, 1152 and one or more respective sensors 1154, 1156. In the illustrated embodiment, the peripheral and master nodes are connected to one another other over respective pairwise communications paths (shown by dashed lines). In some embodiments, the nodes 1130, 1138, 1140 communicate through respective LoRa communications interfaces over LoRa formatted communications paths 1158, 1160, 1162.

In the illustrated embodiment, the master and peripheral nodes 1130, 1138, 1140 include environmental sensors for obtaining information regarding environmental characteristics in the vicinity of the associated logistic items 1132, 1134, 1136. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1130 periodically broadcasts advertising packets in the surrounding area. When the peripheral nodes 1138, 1140 are within range of master node 1130, and are operating in a listening mode, the peripheral nodes 1138, 1140 will extract the address of master node 1130 and potentially other information (e.g., security information) from the advertising packets. If, according to their respective programmatic code, the peripheral nodes 1138, 1140 determine that they are authorized to connect to the master node 1130, the peripheral nodes 1138, 1140 will attempt to pair with the master node 1130. In this process, the peripheral nodes 1138, 1140 and the master node 1130 determine each other's identities, capabilities, and services. For example, after successfully establishing a respective communication path 1158, 1160 with each of the peripheral nodes 1138, 1140 (e.g., a LoRa formatted communication path), the master node 1130 determines certain information about the peripheral nodes 1138, 1140, such as their identity information (e.g., peripheral nodes), their capabilities (e.g., measuring temperature data), and their services include transmitting temperature data to other nodes.

After establishing LoRa formatted communications paths 1158, 1160 with the peripheral nodes 1138, 1140, the master node 1130 transmits requests for the peripheral nodes 1138, 1140 to transmit their measured and/or locally processed temperature data to the master node 1130.

In the illustrated embodiment, the master node 1130 can determine its own location based on geolocation data transmitted by a satellite-based radio navigation system 1166 (e.g., GPS, GLONASS, and NAVSTAR) and received by the GPS receiver 1142 component of the master node 1130. In an alternative embodiment, the location of the master node 1130 can be determined using cellular based navigation techniques that use mobile communication technologies (e.g., GSM, GPRS, CDMA, etc.) to implement one or more cell-based localization techniques. After the master node 1130 has ascertained its location, the distance of each of the logistic items 1134, 1136 from the master node 1130 can be estimated based on the average signal strength of the advertising packets that the master node 1130 receives from the respective peripheral node. The master node 1130 can then transmit its own location and the locations of the package nodes H, J, and I to a server over a cellular interface connection with a cellular network 1172. Other methods of determining the distance of each of the logistic items 1134, 1136 from the master node 1130, such as Received Signal-Strength Index (RSSI) based indoor localization techniques, also may be used.

In some embodiments, after determining its own location and the locations of the peripheral nodes, the master node 1130 reports the location data, the collected and optionally processed (e.g., either by the peripheral nodes peripheral nodes 1138, 1140 or the master node 1130) sensor data to a server over a cellular communication path 1170 on a cellular network 1172.

FIG. 12 shows a network 1200 formed by a master agent 1232 attached to an example asset 1230 (also referred to herein as parcels, boxes, containers, etc.), a secondary agent 1236 attached to an example cabinet 1234, and a tertiary agent 1240 attached to example infrastructure 1238. In some embodiments, the agent 1232 is not the master agent and one of the secondary or tertiary agents 1236, 1240 is the master agent. In some embodiments, no agent 1232, 1236, 1240 is the master agent, and the agents share managerial roles. The tape agents 1232, 1236, 1240 are associated with their respective objects (e.g., the asset 1230, the cabinet 1234, and the infrastructure 1238), but are not limited to these example objects. For example, the tape agents 1232, 1236, 1240 may be associated with any object such as infrastructure (e.g., walls, pillars, buildings, etc.) or vehicles (e.g., automobiles, planes, ships, trains, drones, etc.) or any other such physical object. For example, the master agent 1232 may attach to a package (e.g., the asset 1230) and the secondary and tertiary agents 1236, 1240 may each attach to infrastructure, such as a wall or a building.

In the example of FIG. 12, the master-agent 1232 is a child-node (as discussed in table 1329, with reference to FIG. 13), has a low-power wireless-communications interface (e.g., low-power communication interface 652 of FIG. 6A implementing Bluetooth LE), and is optionally marked with a white-colorant. The secondary agent 1236 is an intermediate-node (as discussed in table 1329), has a low-power wireless-communications interface and a medium-power communications-interface (e.g., medium-power communication interface 672' of FIG. 6B implementing LoRa), and is optionally marked with a green-colorant. The tertiary agent 1240 is a parent node (as discussed in table 1329), has three low-power communications capabilities (e.g., each implementing a different one of Bluetooth LE, NFC, and RFID), a medium power communications interface, and a high-power communications interface (e.g., high-power communication interface 682" of FIG. 6C implementing cellular), and is optionally marked with a black colorant.

In addition to packaging applications, the master, secondary, and tertiary agents 1232, 1236, and 1240 may be deployed on or within physical premises, such as buildings, warehouses, and other infrastructure. For example, the secondary and tertiary agents 1236, 1240 are deployed on physical premises infrastructure (e.g., walls, doors, and conveyor systems), vehicles (e.g., fork lifts, trucks, and carts), and objects (e.g., boxes, packages, documents, coffee mugs, cabinets). In another example, the second and tertiary agents 1236, 1240 are deployed sporadically or periodically in room of a storage facility, such as where one of the second and tertiary agents 1236, 1240 is deployed on every fifth cabinet housing 1234 in infrastructure 1238, where the cabinet housings store multiple packages 1230 with master agents 1232 attached thereto.

In some embodiments, one or more of the master agent 1232, the secondary agent 1236, and the tertiary agent 1240 receive data, from the server, that includes descriptions of the resources that are available from the master agents 1232 over the network 1200. Examples of such resources are sensors, such as a temperature sensor, a moisture sensor, and an acceleration sensor; communication interfaces, such as Bluetooth communications interfaces, LoRa communications interfaces, and cellular communications interfaces; power sources, such as mains power and battery power; and memory resources. In one operational example, when the master agent (child node) detects that it has insufficient resources to complete a task, the master agent broadcasts, to other agents within wireless range, a request asking whether the insufficiency (e.g., a sensor required to collect data of a certain type, such as a vibration sensor to collect vibration data, and accelerometer to detect movement, etc.) may be remedied by at least one of the other agents sharing one or more resources (e.g., sensors, such as a vibration sensor or an accelerometer). In this example, the master agent (child node) broadcasts, using low power communication interface 652 of FIG. 6A, a message requesting the type of resource required and a deadline for completing the task. If at least one other agent in the environment of the master agent that receives the message is able to satisfy the request, the other agent sends a reply message to the master agent (child node). Where multiple agents respond, the master agent (child node) may select one of the multiple agents to provide the resource based on one or more criteria (e.g., the first agent to reply to the request). Accordingly, the master agent (child node) may receive a confirmation message from the other agent indicating that the requested task either was completed or was not completed. Depending on the type of task to be performed by the selected agent, the master agent (child node) may or may not receive a data payload in the confirmation message.

FIG. 13 is a table 1329 showing attributes of the three different types of agent platforms: master agent, secondary agent, and tertiary agent. This table 1329 may be preprogrammed into the memory (e.g., 658, 658', 658", FIG. 6A-6C) of each agent, where the processors (e.g., 650, 650', 650", FIG. 6A-6C) of each agent may execute instructions according to the role of each agent. The left column of table 1329 lists the attributes of the master agent. Among the attributes of the master agent are a master agent role (e.g., the agent may have a role that includes directing other agents to perform predetermined functions, such as instructing other master agents, or secondary or tertiary agents, to perform the predetermined functions); a child agent (e.g., the child agent may have a role that includes being directed by a parent agent to perform predetermined functions according to the parent-agent's instructions) placement in physical premises (a peripheral or leaf node placement); and a low-power wireless-communications interface (e.g., a Bluetooth LE communications interface or a Zigbee communications interface), the medium-power wireless communications interface, or the high-power wireless-communications interface. The master agent role attribute enables the master agent to exercise unilateral control over other non-master types of agents, such as a secondary agent and a tertiary agent. However, when the secondary or tertiary agent is a parent and the master agent is a child, the parent may instruct the child to perform tasks. The child node attribute configuration corresponds to a peripheral end node or leaf node that interacts in a particular environment (e.g., physical premises, such as a building, warehouse, loading dock, etc.).

In some embodiments, the master agents may request resources or data from the secondary and tertiary agents. The requested resources may be to complete specific functions or tasks that the master agent is configured to perform. In some cases, the master agent does not have the capabilities, components, or configuration associated with the requested resources or data, and may rely on the secondary and tertiary agents to provide the resources and data. For example, a master agent may not include a GPS sensor, but may determine its relative location by requesting location data from a secondary or tertiary agent nearby that is equipped with a GPS sensor.

The center column of table 1329 lists the attributes of the secondary agent. Among the attributes of the secondary agent are a secondary agent role (e.g., the secondary agent may include a medium-power wireless-communication interface, such as indicated with reference to FIG. 6B, that may communicate with a stationary or mobile gateway); an intermediate parent-node placement in a physical premises within communication range of one or more child nodes (e.g., a master agent child node) and optionally within communication range of one or more of the tertiary agent parent nodes; and low and intermediate-power wireless-communications interfaces (e.g., Bluetooth LE and LoRa communications interfaces). The intermediate parent-node attribute configuration corresponds to an intermediate node that communicates with the child nodes in the physical premises and communicates with the tertiary agent. In the illustrated embodiment, the secondary agent may also have a low-power wireless-communications interface (e.g., Bluetooth LE communications interface) for communicating with the child nodes and a medium-power wireless-communications interface (e.g., LoRa communications interface) for communicating with a parent node (e.g., a tertiary agent) or server node (e.g., a stationary gateway) over longer-distance wireless-communication links. In the illustrated embodiment, the communications interfaces of the secondary tape agent are backward compatible with the child nodes.

The right column of table 1329 lists the attributes of the tertiary agent. Among the attributes of the tertiary agent are a tertiary agent role; a placement in relation to the physical premises that is within range of the of the secondary agent and optionally within communication range of one or more of the master agents; and low, intermediate, and high-power communications interfaces (e.g., with reference to FIG. 6C, that may include Bluetooth LE, LoRa, Cellular, NFC, and RFID communications interfaces) for communicating with the master and secondary agents. In the illustrated embodiment, the communications interfaces of the tertiary agent are backward compatible with the master and secondary agents.

A master agent (master node) may include a low-power wireless-communication interface configured to communicate with secondary and tertiary agents (intelligent nodes) within a proximity (e.g., wireless range) of the low-power wireless-communication interface. A secondary agent (node) may be configured to execute instructions received from the master agent (master node) and the secondary agent may include one or both of a low-power wireless-communication interface and a medium-power wireless-communication interface. The medium-power wireless-communication interface may have a longer range of communication than the low-power wireless-communication interface, as discussed above. A tertiary agent (tertiary node) may be configured to execute instructions received from the master agent (master node) and the tertiary node may include one or more of a low-power wireless-communication interface, a medium-power wireless-communication interface, and a high-power wireless-communication interface. The high-power wireless-communication interface may have a longer range of communication than the low-power wireless-communication and medium-power wireless-communication interfaces and may be configured to wirelessly communicate with a server associated with the network.

Figure 14:
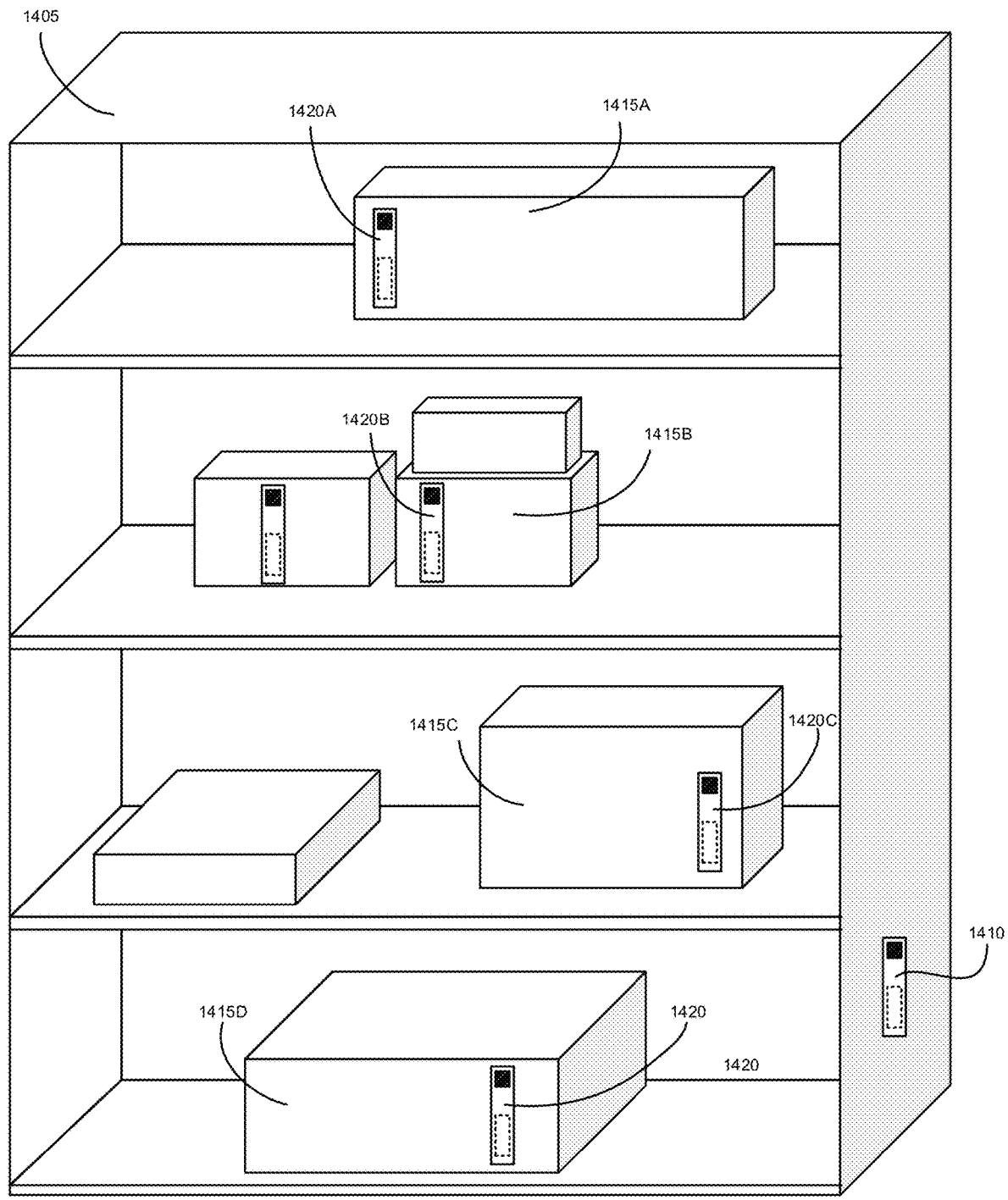
FIG. 14 is a schematic diagram illustrating one example scenario of tape nodes of a wireless sensing system capturing differential data for an asset management application, in an embodiment.

FIG. 14 is a schematic diagram illustrating one example scenario of tape nodes of a wireless sensing system capturing differential data for an asset management application. The tape nodes collaborate to detect emergent events using one or more sensors and to alert users of the wireless sensing system when an event occurs. A set of nodes of the wireless sensing system is associated with one or more areas or assets wherein a differential in sensor data is valuable in detecting events. The set of nodes may be defined based on their location (e.g., within a room, in a cabinet, etc.). Example areas include refrigeration units, storage areas including cold chain assets, cabinets including machinery or electronic components presenting a fire hazard, storage areas wherein vacuum or other pressure conditions are required, and the like.

In the example of FIG. 14, the white tape nodes 1420A-D and the green tape node 1410 are within the same area. Each of the at least one white tape node 1420A-D and the green tape node 1410 includes at least one environmental sensor (e.g., a temperature sensor, a vibration sensor, an accelerometer, a gyroscope, humidity sensor, etc.) and a low-power wireless communications system such as Bluetooth. The at least one green tape node 1410 further includes at least one longer-distance wireless communications capability. Further, the green tape node 1410 may only have the low-power wireless-communications interface (e.g., Bluetooth Low Energy), and there may be a separate gateway tape node or line-powered gateway in Bluetooth Low Energy range that communicates with the green tape node 1410 for getting data up to the server 804. The tape nodes of the wireless sensing system are deployed throughout a location (e.g., a shipping port, checkpoint, shipping center, etc.) or area of interest (e.g., cabinet, room, etc.) such that each white tape node 1420A-D of one or more white tape nodes is able to communicate with at least one green tape node 1410. The location or area of interest may not be predetermined, but rather the set of tape nodes are defined based on where they are deployed. For example, each white tape node within a cabinet may be defined as a first set; each white tape node within a server rack may be defined as a second set; etc. The green tape node 1410 is therefore able to act as an intermediate between the one or more white tape nodes 1410 and other nodes of the wireless sensing system (e.g., by receiving and transmitting data between the one or more white tape nodes and gateway nodes, servers, clouds, or other nodes of the wireless sensing system 800), reducing an amount of high-power communications performed by the one or more white tape nodes. In an example, the tape nodes are deployed such that one or more large cabinets 1405 storing assets 1415A-D (such as machinery, packages, etc.) each include a plurality of white tape nodes 1420A-D, which are associated with assets 1415A-D, within communications distance of at least one green tape node 1410, e.g., the white tape nodes 1420A-D are deployed within a large cabinet (attached to assets 1420A-D within the cabinet 1405) and the green tape node 1410 is adhered or affixed to an external surface of the large cabinet 1405.

The tape nodes capture sensor data of current environmental characteristics (e.g., temperature, humidity, pressure, etc.) around the tape nodes. In the example of FIG. 14, white tape nodes 1420A-D (e.g., the tape agent 1232) are attached to packages 1415A-D (e.g., package 1230) that are stored within the cabinet 1405 (e.g., cabinet 1234) capture internal environmental data corresponding to relative positions within the cabinet 1405, and green tape nodes 1410 (e.g., secondary agent 1236) deployed on external surfaces of the cabinet 1405 or in a surrounding area (e.g., on a wall of the room where the cabinet 1405 is located) capture external environmental data corresponding to a surrounding environment in a room. In an embodiment, the white tape nodes 1420 communicate measured environmental data to a corresponding green tape 1410 in real-time or at intervals (e.g., in 5 s intervals, 1-minute intervals, etc.). Responsive to receiving the measured internal environmental data, the green tape node 1410 computes an environmental differential between internal environmental data captured by the white tape nodes 1420A-D and external environmental data captured by the green tape node 1410 and determines whether an event is occurring based on a differential between the measured environments being outside a defined range.

In some embodiments, the defined range may be based on the actual value measured by either the green tape node 1410 or the white tape node 1420. For example, when a white tape node 1420 reports an exceptionally high value (e.g., a temperature far exceeding an acceptable temperature, such as 50 degrees Celsius above an acceptable temperature for an asset), regardless of the differential, an event may be detected. For example, this may include events when a window is broken and the external environmental data (e.g., temperature) reached steady state with the internal environmental data, and an event based on a differential in environmental would not be detected. For example, if there is an earthquake and the environmental data is vibration data, the asset may be damaged, although no discernable difference between the internal and external environmental data is detected. Any condition for setting an event is within the scope of this application, e.g., an absolute value of the internal or external environmental data. In some embodiments, prior to comparing the internal environmental data to the external environmental data, the green tape node 1410 may compare each of the measurements of internal environmental data from each white tape node 1420A-D.

The environmental differential may be determined by subtracting like characteristics of the internal environmental data (e.g., in the form of a numerical value of specific units such as Fahrenheit, Pascals, etc.) collected by the white tape nodes 1420A-D from the external environmental data collected by the green tape nodes 1410. In some embodiments, the determined environmental differential of each characteristic is compared to a predetermined environmental threshold for that characteristic that defines an acceptable range. If the comparison yields a value that is outside the acceptable range for any one of the characteristics the green tape node 1410 may generate a notification or an alert. For example, the environmental data includes multiple measured environmental characteristics (temperature characteristic, humidity characteristic, pressure characteristic, etc.). For example, the temperature characteristic collected by the white tape nodes 1420A-D and green tape node 1410 is 70 degrees Fahrenheit and 50 degrees Fahrenheit, respectively, and the resulting environmental differential for the temperature characteristic is 20 degrees Fahrenheit. Where the temperature characteristic threshold is plus or minus 5 degrees Fahrenheit, the threshold is exceeded and, in response, the green tape node 1410 generates the notification and/or the alert for transmittal to the server, a client device (e.g., the mobile gateway 810) operated by a user, and/or nearby tape nodes. The alert may include instructions on how to remedy the environmental differential and any data collected by the white tape nodes 1420A-D and/or green tape nodes 1410. Similar evaluation is made for all characteristics of the environmental data, e.g., humidity data, vibration data, pressure data, etc.

In some embodiments, the white tape nodes 1420A-D transmit the collected internal environmental data to the green tape nodes 1410, and the green tape nodes 1410 compute the environmental differential between the internal environmental data and the external environmental data. Further, the green tape nodes 1410 store the predetermined environmental thresholds locally and compare the environmental differential to the predetermined environmental threshold, to determine if the threshold is exceeded. In some embodiments, both the white tape nodes 1420A-D and the green tape nodes 1410 transmit the collected internal and external environmental data to a server (e.g., server 804), where the environmental differential and comparison is computed.

A high temperature differential between internal and external temperature readings (e.g., wherein one white tape 1420A-D measurement is significantly higher than the green tape 1410 measurements), indicate an event, such as a fire, within the cabinet, or asset/machinery overheating. In another example, where white tape nodes 1420A-D are attached to cold chain assets stored in a refrigeration unit, a high negative temperature differential indicates normal operation and a low temperature differential indicates that the refrigeration unit is no longer working. In yet another example, the white tape nodes 1420A-D may be applied to servers within a data center and the green tape nodes 1410 are applied to one or more server racks or to walls throughout the data center; a high temperature differential between the server and the server rack or the data center may indicate that the server is overheating.

In another example of operation, multiple green tape nodes 1410 are deployed in the same area (e.g., on different cabinets within a room, such as a data center), whereby at least one of the green tape nodes 1410 determines an average temperature for the area. For example, the green tape nodes 1410 are attached to one in every five server racks throughout a data center and white tape nodes 1420A-D are attached to every other server within a server rack). The green tape nodes 1410 may collectively determine (e.g., average) a temperature throughout the entire data center, or may determine a temperature for each quadrant of the data center. For each quadrant, the green tape nodes 1410 collect temperature data and determine an average temperature of the quadrants, and may compare that average temperature to other quadrants. Advantageously, the green tape nodes may thereby identify a fire or a broken cooling unit within any one of the quadrants of the data center.

In some embodiments, the tape nodes 1410, 1420A, B comprise additional or different sensors. For example, the tape nodes comprise pressure sensors, accelerometers, or other data sensors configured to capture data, and the green tape node 1410 computes a differential for data captured by white tape nodes 1420A, B and the green tape node 1410 and determines, based on the computed differential, whether an event is occurring. For example, the acceleration sensor of a white tape node 1420A-D may detect an acceleration that exceeds the collected acceleration of the green tape node 1410. This acceleration differential may be compared to a predetermined acceleration, and may exceed an environmental (acceleration differential), indicating that the asset the white tape node 1420A-D was attached thereto has fallen, is being stolen, etc. For example, a vibration differential between a white tape node 1420A-D and a green tape node 1410 may exceed a predetermined vibration differential, indicating someone is attempting to steal the asset that the white tape node is attached thereto.

Responsive to the green tape node 1410 determining the threshold is exceeded, the green tape node 1410 transmits an alert to a user of the wireless sensing system (e.g., the wireless sensing system 800). In some embodiments, the green tape node communicates with a gateway (e.g., mobile gateway 810, 812 or stationary gateway 814), server (e.g., server 804), or cloud of the wireless sensing system (e.g., wireless sensing system 800). In some embodiments, the green tape node 1410 communicates with a mobile or wearable device, e.g., client application of a mobile phone or smart watch (e.g., mobile gateway 810 employing a client application 822), of the user. In some embodiments, the green tape node 1410 communicates with an electronic circuit associated with the asset or area of interest, e.g., a flashing light circuit mounted to a wall, an acoustic alarm, or the like. In embodiments where the server determines the threshold is exceeded, the server may alert the user through the various methods described herein.

In some embodiments, the wireless sensing system guides a user of the wireless sensing system to a location of the event and instructs a user to perform certain actions. For example, the wireless sensing system communicates information describing the event, including a location and type of event, to the mobile device of the user. In embodiments, when the green tape node 1410 (or the server) determines the threshold is exceeded, the green tape node 1410 (or the server) communicates to a mobile device to display a pin (e.g., pin 1505) within a map displayed on a user interface of the mobile device, to indicate the location of the event (e.g., where the white tape node 1420A-D and/or the green tape node 1410 indicate the exceeded threshold).

Figure 15B:
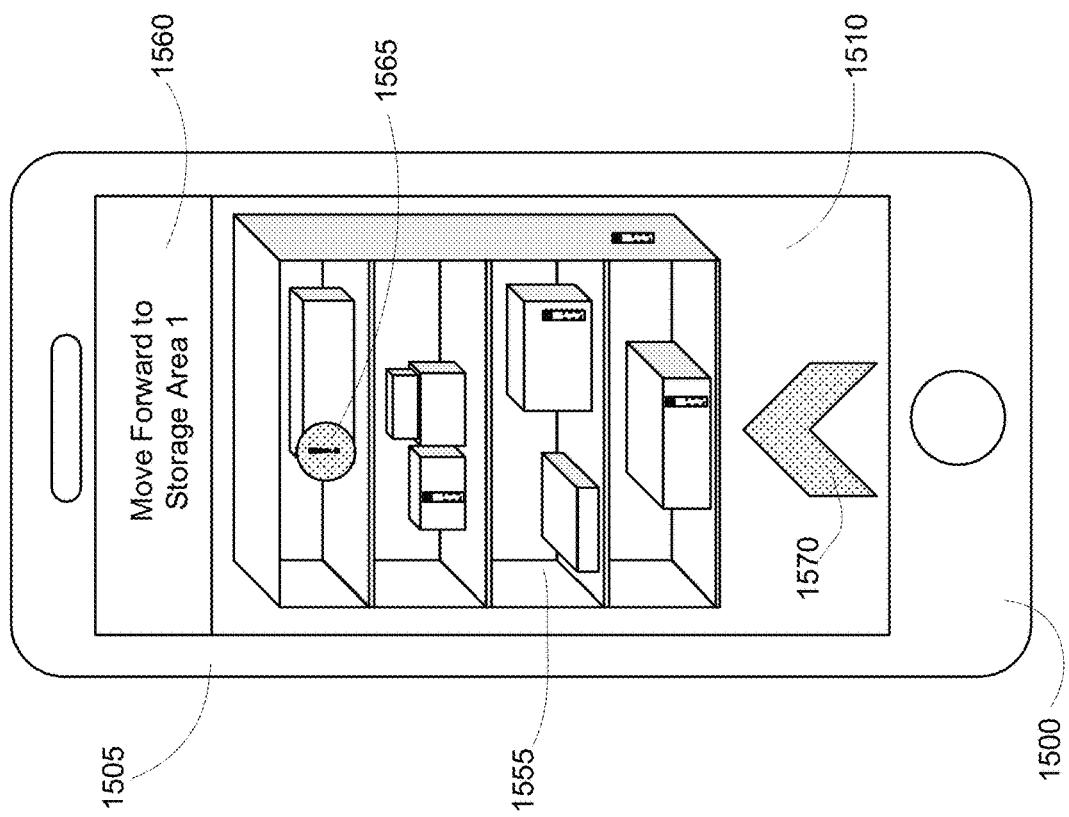
FIG. 15B is an example screen shot of a user interface using augmented reality to display AR overlays to indicate an event detected by a wireless sensing system, in an embodiment.
Figure 15A:
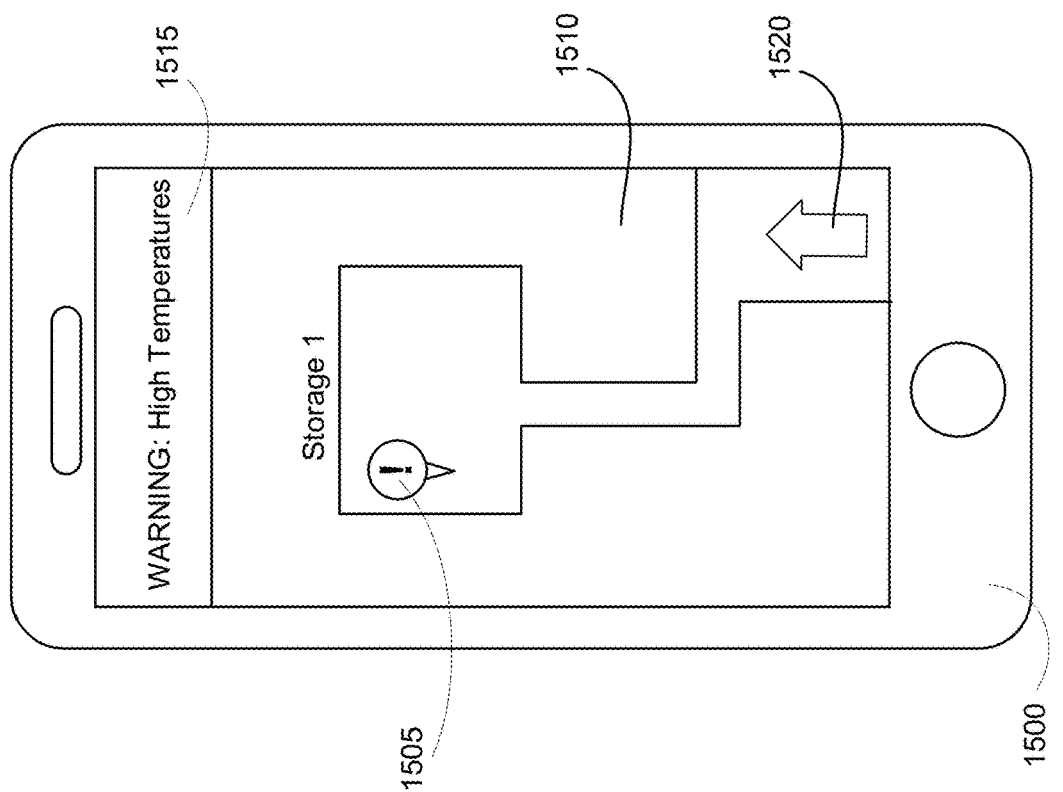
FIG. 15A is an example screen shot of a user interface displaying a map and directions that guide a user to an event detected by a wireless sensing system, in an embodiment.

FIGS. 15A-B are screenshots of an example user interface using augmented reality to guide a user to a location where an environmental differential has exceeded a threshold. In the embodiment of FIG. 15A, the user interface 1510 displays a map representation of a building or area of interest and identifies the location of the event using one or more of a pin 1505, instructions 1515, a guiding arrow 1520, or other visual or audio signals. In an embodiment, the map representation of the building or area of interest is selected based on the client device location determined by the wireless sensing system 800 (e.g., GPS data communicated by satellite). For example, the indications on the map may be updated by the wireless sensing system 800 in response to the tape nodes (e.g., the white tape nodes 1420A-D and the green tape nodes 1410) transmitting location data to the server 804 of the wireless sensing system 800. In other embodiments, the map representation of the building or area of interest is determined based on the sensor data (e.g., environmental data, location data, etc.) captured by the tape nodes (e.g., the white tape nodes 1420A-D and the green tape nodes 1410) of the wireless sensing system 800, e.g., based on paths of frequent traffic through a building or area of interest, locations of assets, historic movement through the building or area of interest, and the like. In embodiments, the client application (e.g., client application 822 of the wireless sensing system 800) generates the display within the user interface 1510 of the client device, illustrated in both FIGS. 15A, B. In one example, the client application receives data from the server or the tape nodes and updates the user interface 1510 in real-time.

In the example of FIG. 15B, the user interface 1510 comprises an augmented reality interface, where pins 1565 (e.g., pins 1505), guiding arrows 1570 (e.g., guiding arrows 1520), instructions 1560 (e.g., instructions 1515), or other visual or audio signals are overlaid on real-time video or image data captured through a camera of the mobile device 1500. For example, the client application (e.g., client application 822) controls the mobile device 1500 to captures image or video data through the camera and applies one or more pins 1565, arrows 1570, and text instructions 1560 to the captured image or video data displayed on the mobile device 1500 to guide the user to the location of the event and to perform one or more actions to address the event or to allow the user to address the event. In another embodiment, the user interface 1510 comprises an augmented reality interface generated at least in part using one or more augmented reality algorithms, e.g., 3D or AR view, and sensor data from one or more tape nodes of the wireless sensing system.

In an embodiment, the user interface 1510 display may switch from the map display (FIG. 15A) to the AR display (FIG. 15B) when the mobile device is within a predefined radius (e.g., 5 feet, 10 feet, etc.) of the white tape node (e.g., white tape node 1420A-D) or the green tape node (e.g., the green tape node 1410) associated with the event. For example, as the user enters the room containing the white tape node and the green tape nodes, the client application running on the mobile device 1500 activates the camera and displays the live feed with the AR overlay of the pin 1565 near the white tape node attached to the asset. The user interface 1550 may also display a guiding arrow 1570 to guide the user to the asset, and may display instructions 1560 guiding the user to the asset.

In an embodiment, the user interface 1550 includes one or more interactable elements. For example, the pins 1565 representative of the tape nodes deployed in a building or area of interest may be selectable, whereupon the user interface 1510 provides information (e.g., a current or most recent sensor data point, a graphical representation of collected sensor data, a name or identifier associated with the tape node, a status of the tape node, or other information) associated with the corresponding tape node. The user interface 1550 may incorporate different elements and may use combinations of map data, graphical representations of reality, image or video data, and the like, without departing from the scope hereof. Further, the pin 1565, 1505, upon being selected, may cause the user interface 1550 to display information associated with the white tape nodes, the green tape nodes, and/or the collected environmental data. For example, the associated information may include temperature data collected by the white tape nodes and the green tape nodes, and the temperature differential between the two collected temperatures. Further, the associated information may include the type of asset and corresponding safety information so that the user is aware of any potential injuries and may prepare to take action accordingly. For example, where the asset is a piece of machinery and the environmental differential is a temperature differential of 100 degrees Fahrenheit, the information may include a warning that the asset is very hot and to use specific gloves when handling the asset.

Figure 16:
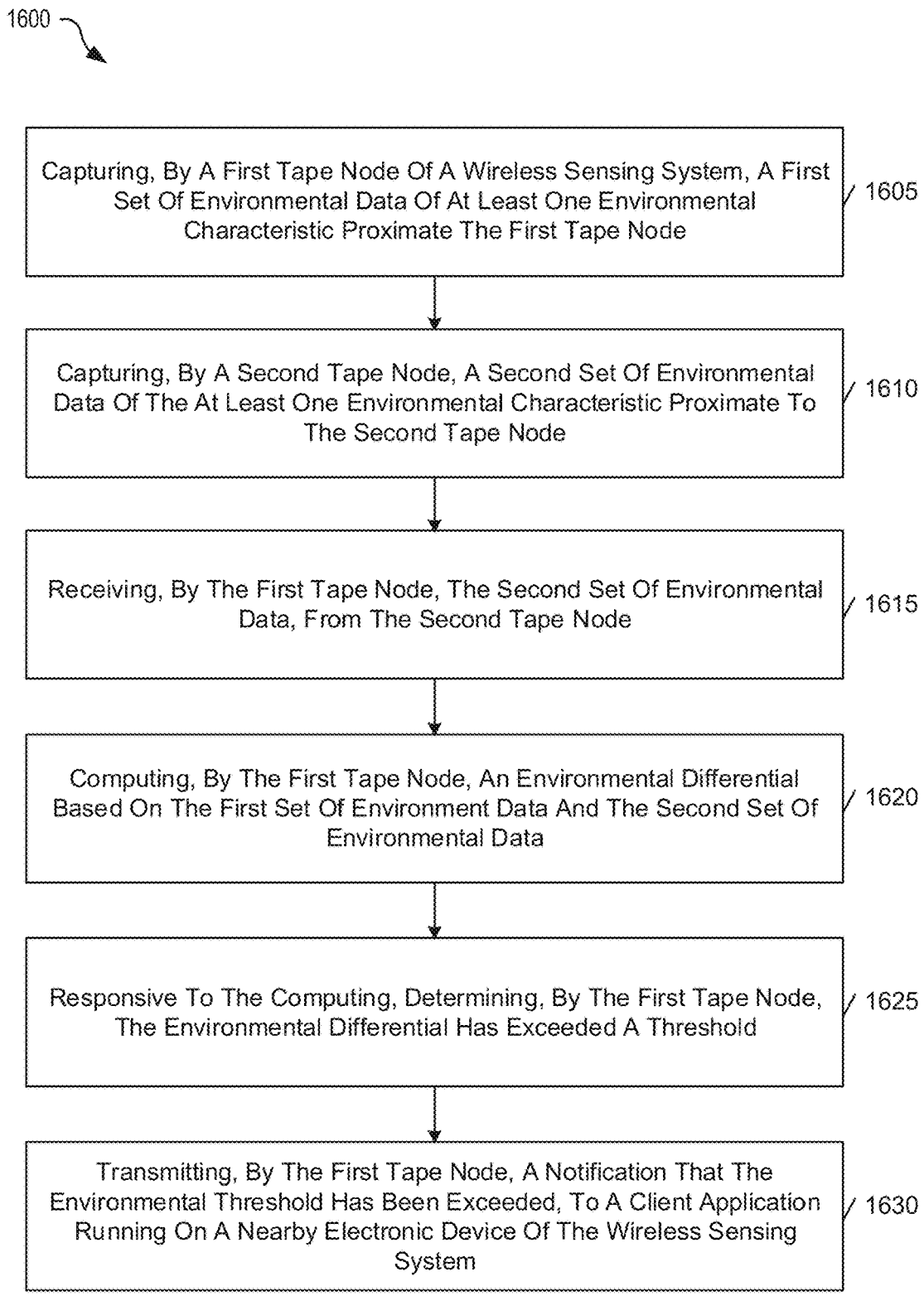
FIG. 16 is a flowchart illustrating one example method of an asset management application for using differentials in tape node sensor data to detect an event, in an embodiment.

FIG. 16 is a flowchart illustrating one example method 1600 for using environmental data differentials to detect an event in asset management applications. A first tape node (e.g., the green tape node 1410) of a wireless sensing system (e.g., wireless sensing system 800) captures (1605) a first set of environmental data (e.g., temperature data, vibration data, humidity data, biological data, etc.) of at least one environmental characteristic (e.g., temperature, pressure, humidity, etc.). In one example of block 1605, the first tape node captures temperature in an area proximate to the first tape node. For example, the environmental characteristic is ambient temperature of an area surrounding a cabinet 1405 the green tape node 1410 is attached thereto.

A second tape node (e.g., white tape node 1420A) captures (1610) a second set of environmental data. In one example of block 1610, the at least one environmental characteristic corresponds to an internal temperature of a room, asset, storage container, refrigeration unit, cabinet, machinery, or the like, such as temperature of an area around white tape node 1420A applied to asset 1415A located within a cabinet 1405. The first tape node receives (1615) the second set of environmental data from the second tape node. In one example of block 1615, the second tape node transmits the second set of environmental data to the first tape node. In some example of block 1615, the second tape node transmits the second set of environmental data to a server (e.g., server 804), and the server relays the second set of environmental data to the first tape node.

The first tape node computes (1620) an environmental differential (e.g., a difference between the temperature collected by the first tape node and the second tape node, as described with reference to FIG. 14) based on the first set of environmental data and the second set of environmental data. Responsive to the computing, the first tape node determines (1625) that the environmental differential has exceeded a predetermined environmental threshold. For example, the first tape node determines the environmental threshold has exceeded a predetermined environmental threshold by comparing the environmental differential to a predetermined environmental threshold, as described above with reference to FIG. 14. In some embodiments, the predetermined environmental threshold is stored locally within memory of the first tape node. In some embodiments, a server receives both sets of environmental data from the first tape node, performs both the computing (1620) and the determining (1625) steps, and then transmits the results to the first tape node.

Method 1600 further includes the first tape node transmitting (1630) to a client application running on a nearby electronic device of the wireless sensing system, a notification that an environmental threshold has been exceeded. For example, the first tape node transmits a notification of the event to a gateway (e.g., mobile gateway 810, 812 and/or stationary gateway 814), server (e.g., server 804), or cloud of the wireless sensing system (e.g., the wireless sensing system 800), accessible by the client application. In another embodiment, the first tape node transmits a notification of the threshold being exceeded to the server, that is accessible to a client application running on a user device, e.g., a smart phone, smart watch, or other mobile or wearable device (e.g., the mobile device 1500). In some embodiments, the client application generates an indication, using a pin, on a map displayed by the client device, where the first or second tape nodes are located (i.e., the location of the event), along with information associated with the first and second tape nodes and both sets of collected environmental data, as described with reference to FIGS. 15A, B. In embodiments, the notification is transmitted to an electronic circuit (e.g., a flashing light circuit mounted to a wall, an acoustic alarm, and so on) associated or located proximate to the first and/or second tape nodes.

Figure 17:
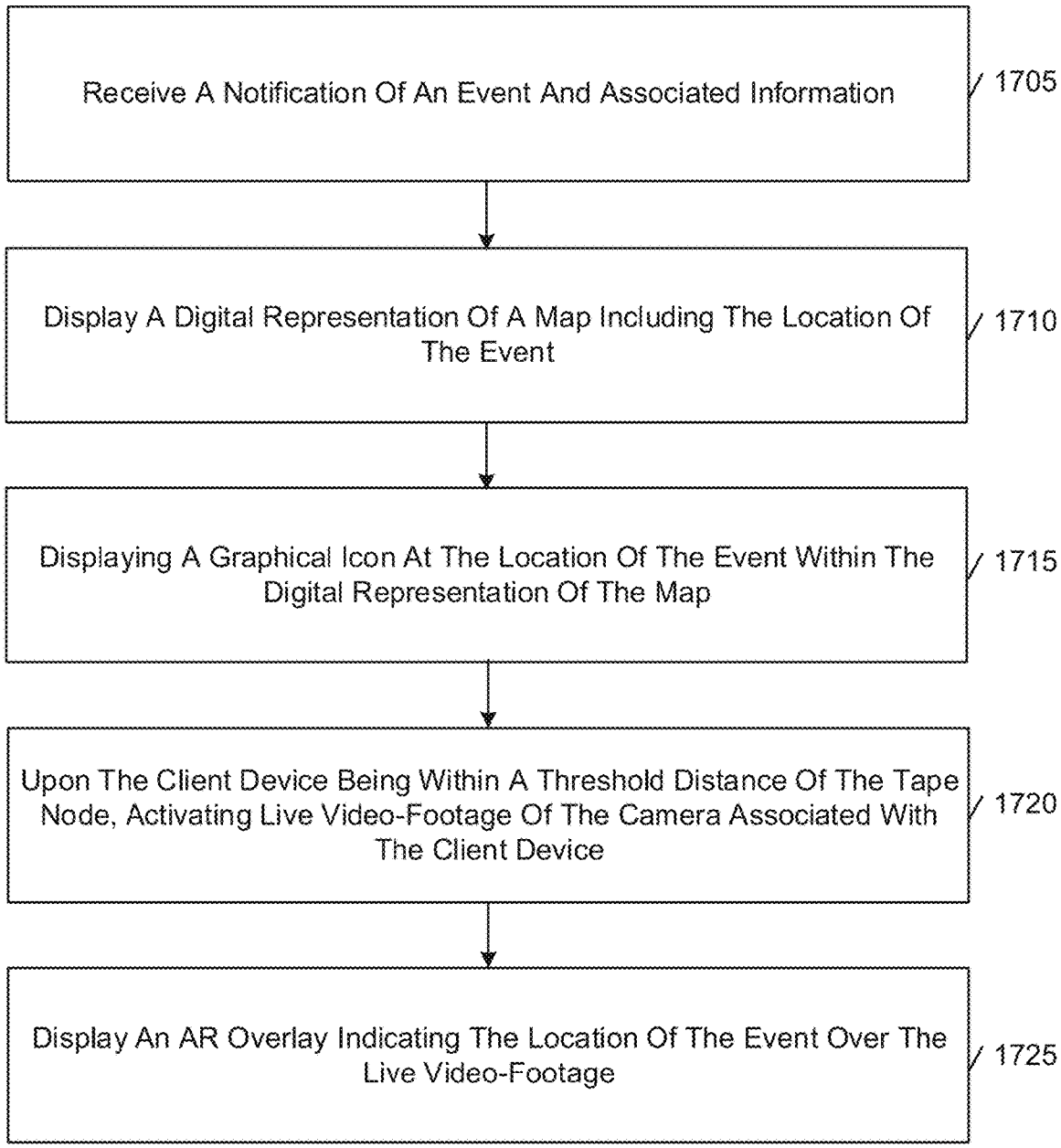
FIG. 17 is a flowchart illustrating one example method for generating an augmented reality overlay on live video-footage of a client device to guide a user to an event when within a threshold distance of the event, according to an embodiment.

FIG. 17 is a flowchart illustrating one example method 1700 for presenting an augmented reality (AR) overlay of an area of an event associated with an environmental threshold being exceeded. Method 1700 is implemented by mobile device 1500 of FIG. 15, for example. Method 1700 includes receiving (1705) a notification, from a tape node, of an event indicating that an environmental threshold being exceeded and associated information. For example, the tape node is the green tape node 1410 and transmits the environmental differential to the client device when the environmental threshold is exceeded, as described with reference to FIGS. 14-16.

Method 1700 further includes displaying (1710) a digital representation of a map including a location of the event within a graphical user interface (e.g., the user interface 1510, FIG. 15A). In some embodiments, the map includes guiding features (e.g., the instructions 1515, the arrow 1520, etc.) that directs a user to the location of where an event was detected by a tape node. In some embodiments, the client device may transmit location data of the client device to the server 804 or the tape node (e.g., the green tape node 1410) to update the map (and the guiding features) in real-time as the user traverses towards the tape node.

Method 1700 further includes displaying (1715) a graphical icon (e.g., the pin 1505) within the map, at a location of the event. In some embodiments, the client device may provide the associated information and health and safety information, in response to receiving user input in the form of a user selecting the dropped pin. For example, the associated information and health and safety information may include the environmental differential (e.g., a temperature differential of 50 degrees Fahrenheit) and a warning that the asset is very hot and to use specific gloves when handling the asset.

Method 1700 further includes, upon the client device being within a threshold distance of the tape node, activating (1720) live video-footage of the camera associated with the client device. In one example of block 1720, the client application activates the camera of the client device when the client device is within ten meters of the tape node. Method 1700 further includes displaying (1725), within a GUI of the client device, an augmented reality (AR) overlay, indicating the location of the event, over the live-video footage. In one example of block 1725, the client application generates the display of the AR overlay over the live video-footage. For example, the user interface 1550 may generate the AR overlay as shown in FIG. 15B. For example, the AR overlay may include the instructions 1560, the pin 1565, the arrow 1570, etc. In some embodiments, the client device does not display augmented reality overlay over the live video-footage, but rather displays the AR overlay over a photo of the tape node, and the surrounding environment, stored in memory of the, or retrieved from the server from, client device.

Figure 18:
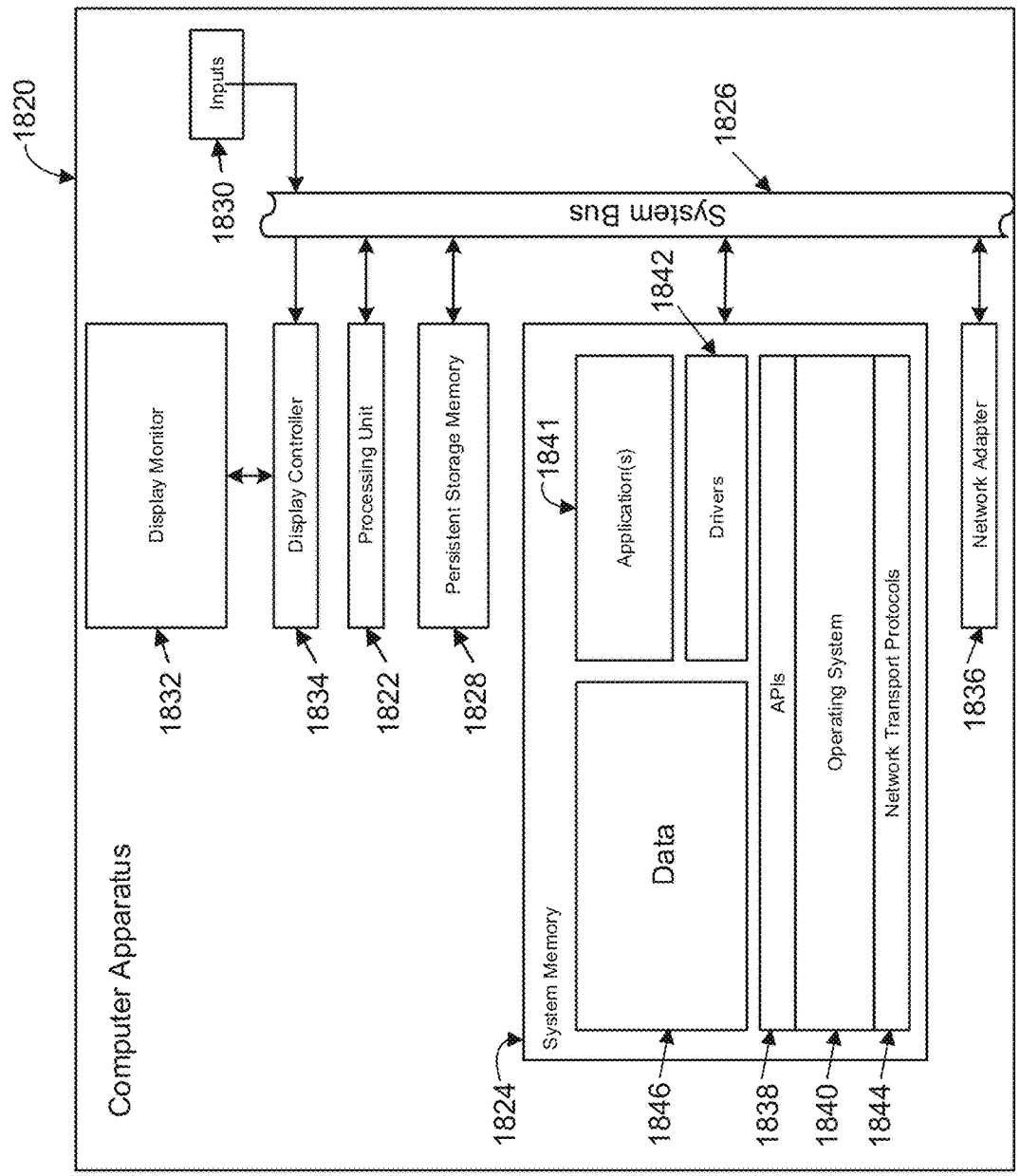
FIG. 18 is a block diagram of an example computer apparatus, according to an embodiment.

FIG. 18 shows an example embodiment of computer apparatus 1820 that, either alone or in combination with one or more other computing apparatus, is operable to implement one or more of the computer systems described in this specification. For example, computer apparatus 1820 may represent any of the segments, 640, 670, 680, server 804, mobile gateway 810, 810, the stationary gateway 814, tape nodes 816, 818, 824, 828, 832, 842-848, 859, 860, the client device 1500, etc. The computer apparatus 1820 includes a processing unit 1822, a system memory 1824, and a system bus 1826 that couples the processing unit 1822 to the various components of the computer apparatus 1820. The processing unit 1822 may include one or more data processors, each of which may be in the form of any one of various commercially available computer processors. The system memory 1824 includes one or more computer-readable media that typically are associated with a software application addressing space that defines the addresses that are available to software applications. The system memory 1824 may include a read only memory (ROM) that stores a basic input/output system (BIOS) that contains start-up routines for the computer apparatus 1820, and a random-access memory (RAM). The system bus 1826 may be a memory bus, a peripheral bus, or a local bus, and may be compatible with any of a variety of bus protocols, including PCI, VESA, Microchannel, ISA, and EISA. The computer apparatus 1820 also includes a persistent storage memory 1828 (e.g., a hard drive, a floppy drive, a CD ROM drive, magnetic tape drives, flash memory devices, and digital video disks) that is connected to the system bus 1826 and contains one or more computer-readable media disks that provide non-volatile or persistent storage for data, data structures and computer-executable instructions.

A user may interact (e.g., input commands or data) with the computer apparatus 1820 using one or more input devices 1830 (e.g. one or more keyboards, computer mice, microphones, cameras, joysticks, physical motion sensors, and touch pads). Information may be presented through a graphical user interface (GUI) that is presented to the user on a display monitor 1832, which is controlled by a display controller 1834. The computer apparatus 1820 also may include other input/output hardware (e.g., peripheral output devices, such as speakers and a printer). The computer apparatus 1820 connects to other network nodes through a network adapter 1836 (also referred to as a "network interface card" or NIC).

A number of program modules may be stored in the system memory 1824, including application programming interfaces 1838 (APIs), an operating system (OS) 1840 (e.g., the Windows® operating system available from Microsoft Corporation of Redmond, Wash. U.S.A.), software applications 1841 including one or more software applications programming the computer apparatus 1820 to perform one or more of the steps, tasks, operations, or processes of the positioning and/or tracking systems described herein, drivers 1842 (e.g., a GUI driver), network transport protocols 1844, and data 1846 (e.g., input data, output data, program data, a registry, and configuration settings).

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

In other embodiments, the method may include additional, fewer, or different steps, and the steps may be performed in a different order. In other embodiments, steps of the method may be performed by different components of the sensing system.

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A wireless sensing system, comprising:
   a first tape node having a low-power wireless-communications interface and an environmental sensor operable to capture and transmit a first set of environmental data of at least one environmental characteristic to a second tape node; and
   the second node comprising:
      an environmental sensor;
      a low-power wireless-communication interface;
      a first processor; and
      a first memory communicatively coupled with the first processor, the first memory storing machine-readable instructions that, when executed by the first processor, cause the first processor to:
         capture a second set of environmental data;

compute an environmental differential between the first set of environmental data and the second set of environmental data;
compare the environmental differential to a predetermined environmental threshold; and
transmit a notification to a client application of the wireless sensing system running on a client device of the wireless sensing system when the environmental differential exceeds the predetermined environmental threshold.

2. The system of claim 1, further comprising:
the first tape node having a medium-power wireless-communications interface; and
the second tape node having a medium-power wireless-communications interface.

3. The system of claim 1, wherein the first tape node is adhered to an internal surface of a cabinet, storage container, refrigerator, freezer, room, or on an external surface of an asset.

4. The system of claim 1, wherein the second tape node is adhered or affixed to an external surface of a cabinet, storage container, refrigerator, freezer.

5. The system of claim 1, wherein the client application generates a user interface within the client device to show an augmented reality (AR) overlay on live video-footage, from a camera associated with the client device, and one or more indicators guiding a user to a location of an event where the environmental threshold has been exceeded.

6. The system of claim 5, wherein the user interface further comprises a set of instructions for guiding the user to the location.

7. The system of claim 5, wherein the AR overlay further includes a graphical representation of one or more assets.

8. The system of claim 5, wherein the user interface further includes an interactable element, the user interface operable to receive user input corresponding to the interactable element to display the collected data from the first and second tape nodes and health and safety information.

9. The method of claim 1, wherein the at least one environmental characteristic is one of temperature, humidity, pressure, acceleration, acoustics, chemicals, radioactivity, an electromagnetic field, a magnetic field, thermal radiation, and light.

10. A method for guiding a user to an event detected by a first tape node of a wireless sensing system, comprising:
receiving, by the first tape node, a first set of environmental data of at least one environmental characteristic, from a second tape node, the first environmental data corresponding to an environmental characteristic proximate to the second tape node;
capturing, by the first tape node, a second set of environmental data of the at least one environmental characteristic proximate the first tape node;
computing, by the first tape node, an environmental differential between the first set of environmental data and the second set of environmental data;
comparing the environmental differential with environmental thresholds; and
transmitting a notification of the event at the location of the first tape node to a client application running on an electronic device when at least one environmental threshold is exceeded.

11. The method of claim 10, wherein the electronic device is a client device, the method further comprising:
displaying, within a user interface of the client device, a digital representation in a form of a map that includes features for guiding a user to the event.

12. The method of claim 11, further comprising displaying a pin on the map to indicate the location of the event.

13. The method of claim 12, the method further comprising:
receiving, by the client application, within the GUI of the client device, user input at a location of the pin within the user interface; and
displaying, by the client application, in place of the location of the pin within the user interface, the collected environmental data and health and safety data.

14. The method of claim 10, further comprising:
responsive to determining the threshold has been exceeded, transmitting, by the first tape node, collected environmental data and health and safety information.

15. A method for guiding a user to an event detected by a first tape node of a wireless sensing system, comprising:
receiving, by a client application of the wireless sensing system running on a client device, a notification, from a first tape node, that an event has occurred, indicating that an environmental threshold has been exceeded, the environmental threshold indicating that an environmental characteristic has affected an asset that a second tape node is attached thereto;
generating, by the client application, a digital representation of a map, within a graphical user interface (GUI) of the client device, that guides a user to a location of the event;
generating, by the client application, a display within the GUI of the client device, a graphical icon to represent a location of the event;
responsive to the client device being within a proximity of either the first tape node or the second tape node, activating, by the client application, a camera of the client device to capture live video-footage; and
generating, within the GUI, an AR overlay on the live video-footage to indicates the location of the event.

16. The method of claim 15, further comprising:
receiving, by the client application, health and safety information relating to the asset, a first set of environmental data collected by the first tape node defining the environmental characteristic proximate the first tape node and a second set of environmental data collected from a second tape node attached to the asset defining the environmental characteristic proximate the asset;
receiving user input at a location within the GUI of the pin; and
generating a display within the GUI that includes the collected environmental data and health and safety information in response to the user input.

17. The method of claim 15, wherein the second tape node is adhered to an internal surface of a cabinet, storage container, refrigerator, freezer, room, or on an external surface of an asset.

18. The method of claim 15, wherein the first tape node is adhered or affixed to an external surface of a cabinet, storage container, refrigerator, freezer.

19. The method of claim 15, wherein the environmental characteristic is one of temperature, humidity, pressure, acceleration, acoustic, chemicals, radioactivity, an electromagnetic field, a magnetic field, thermal radiation, and light.

20. The method of claim 15, wherein
the first tape node is adhered to and associated with a container housing a plurality of assets comprising the asset the second tape node is attached to,
each asset of the plurality of assets is associated with an attached tape node configured to track the respective asset, and the GUI displays an identity of the asset the second tape node is attached to or an identifier associated with the second tape node in relation to the event.

\* \* \* \* \*